United States Patent
Takayama et al.

(10) Patent No.: US 11,008,930 B2
(45) Date of Patent: May 18, 2021

(54) ENGINE CONTROL METHOD AND ENGINE SYSTEM

(71) Applicant: MAZDA MOTOR CORPORATION, Hiroshima (JP)

(72) Inventors: Shinji Takayama, Hiroshima (JP); Takeatsu Ito, Hiroshima (JP); Michio Ito, Hiroshima (JP); Kenko Ujihara, Hiroshima (JP); Daisaku Ogawa, Hiroshima (JP); Daisuke Umetsu, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 16/960,502

(22) PCT Filed: Jan. 22, 2019

(86) PCT No.: PCT/JP2019/001859
§ 371 (c)(1),
(2) Date: Jul. 7, 2020

(87) PCT Pub. No.: WO2019/146593
PCT Pub. Date: Aug. 1, 2019

(65) Prior Publication Data
US 2021/0062709 A1 Mar. 4, 2021

(30) Foreign Application Priority Data
Jan. 23, 2018 (JP) .............................. JP2018-009078

(51) Int. Cl.
*F02B 11/00* (2006.01)
*F02D 41/02* (2006.01)
(Continued)

(52) U.S. Cl.
CPC ............ *F02B 11/00* (2013.01); *B62D 15/021* (2013.01); *F02D 41/021* (2013.01);
(Continued)

(58) Field of Classification Search
CPC ..... F02B 11/00; B62D 15/021; F02D 41/021; F02D 41/1454; F02D 41/045; F02D 2200/50; F02P 5/14
See application file for complete search history.

(56) References Cited

U.S. PATENT DOCUMENTS

2006/0271266 A1* 11/2006 Kakuya ................. F02D 41/021
 701/102
2019/0301372 A1* 10/2019 Hamad ................ B01D 61/362
(Continued)

FOREIGN PATENT DOCUMENTS

| JP | H03258938 A | 11/1991 |
|---|---|---|
| JP | 2001073775 A | 3/2001 |

(Continued)

OTHER PUBLICATIONS

International Search Report issued in PCT/JP2019/001859; dated Mar. 12, 2019.
(Continued)

*Primary Examiner* — George C Jin
(74) *Attorney, Agent, or Firm* — Studebaker & Brackett PC

(57) ABSTRACT

When an incremental amount of a steering angle exceeds a reference incremental amount, an ECU 60 executes vehicle attitude control of reducing an output torque of an engine, and, in a given operating range, drives a spark plug 16 to allow an air-fuel mixture to be self-ignited at a given timing, thereby executing SPCCI combustion. When there is a request for an additional deceleration from the vehicle attitude control (#12: YES) and the SPCCI combustion is
(Continued)

performed (#13: YES), the ECU 60 prohibits ignition retardation and performs torque reduction for the vehicle attitude control, by fuel amount reduction control of reducing the amount of fuel to be supplied into a cylinder 2 (#14). On the other hand, when the SPCCI combustion is not performed (NO in #13), the ECU 60 performs the ignition retardation to attain the torque reduction for the vehicle attitude control (#15).

13 Claims, 17 Drawing Sheets

(51) Int. Cl.
    *F02D 41/14*     (2006.01)
    *B62D 15/02*     (2006.01)
    *F02P 5/14*     (2006.01)

(52) U.S. Cl.
    CPC ............ *F02D 41/1454* (2013.01); *F02P 5/14* (2013.01); *F02D 2200/50* (2013.01)

(56) References Cited

U.S. PATENT DOCUMENTS

| | | | |
|---|---|---|---|
| 2019/0345890 | A1 | 11/2019 | Ota et al. |
| 2020/0240319 | A1* | 7/2020 | Tokunaga ................ F02B 1/12 |

FOREIGN PATENT DOCUMENTS

| | | | |
|---|---|---|---|
| JP | 6112304 B2 | 4/2017 |
| JP | 2017115587 A | 6/2017 |
| JP | 6249084 B1 | 12/2017 |

OTHER PUBLICATIONS

International Preliminary Report on Patentability and Written Opinion issued in PCT/JP2019/001859; dated Jul. 28, 2020.

\* cited by examiner

※ A2, A3: SPCCI combustion

FIG.10
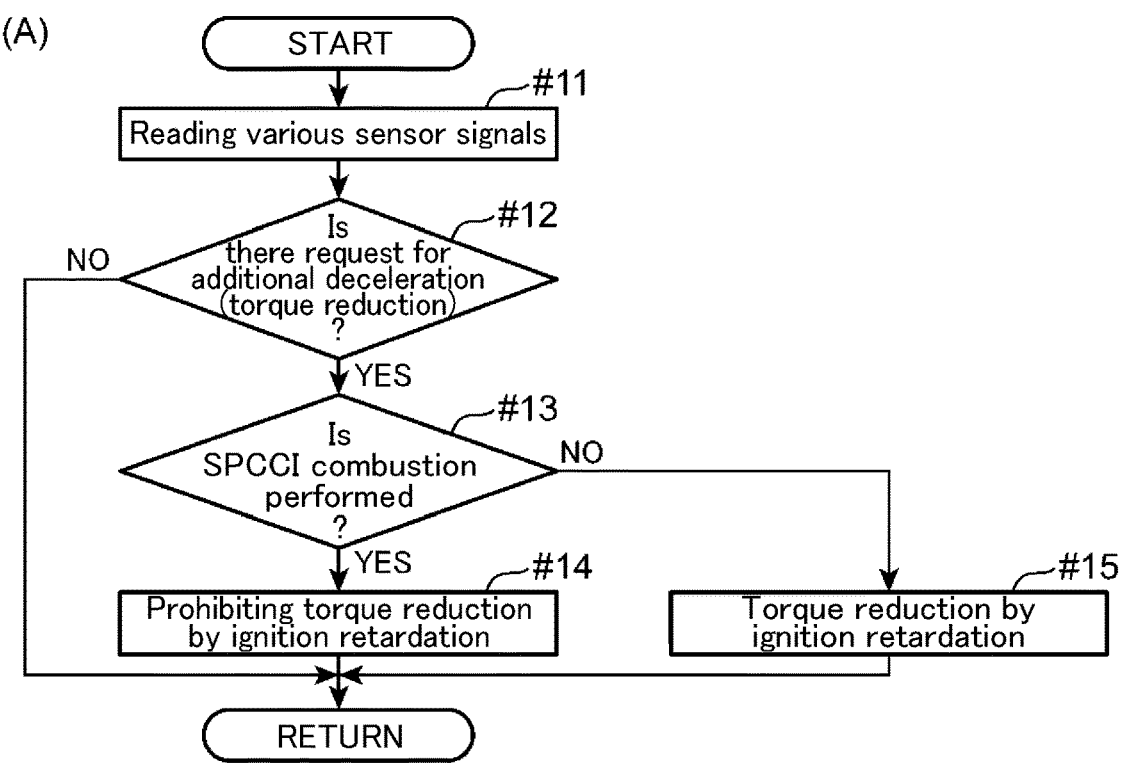
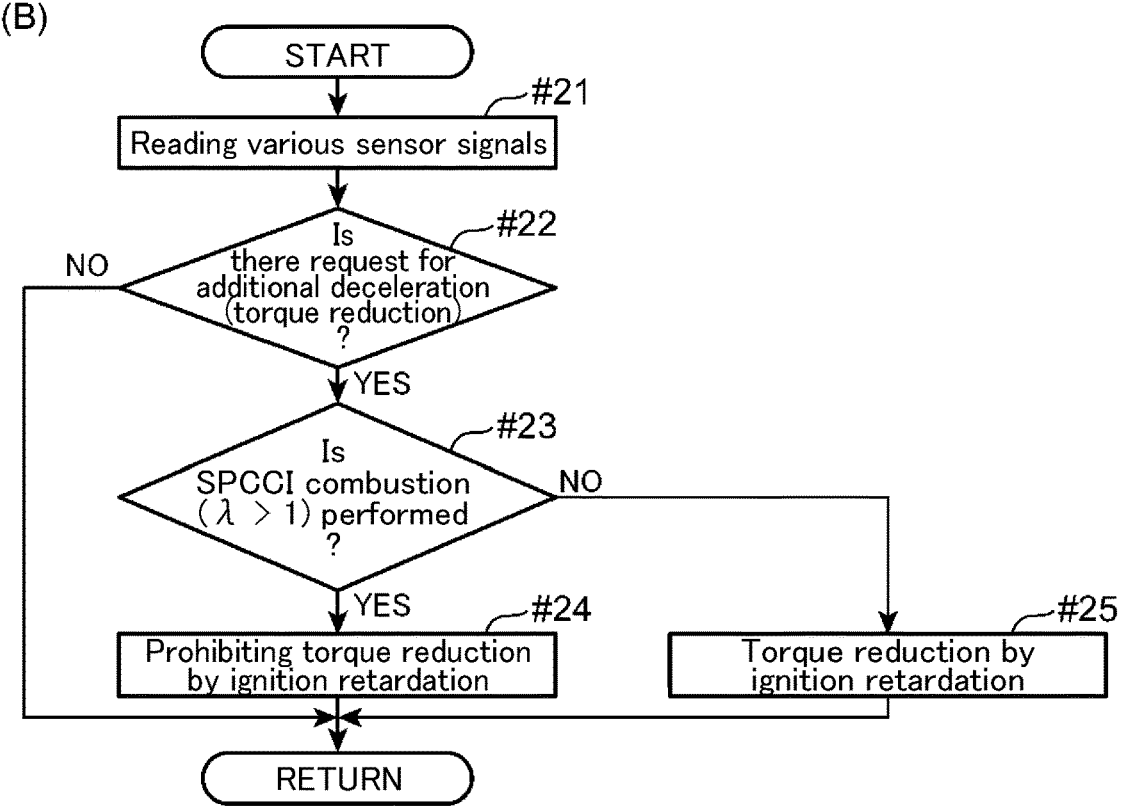

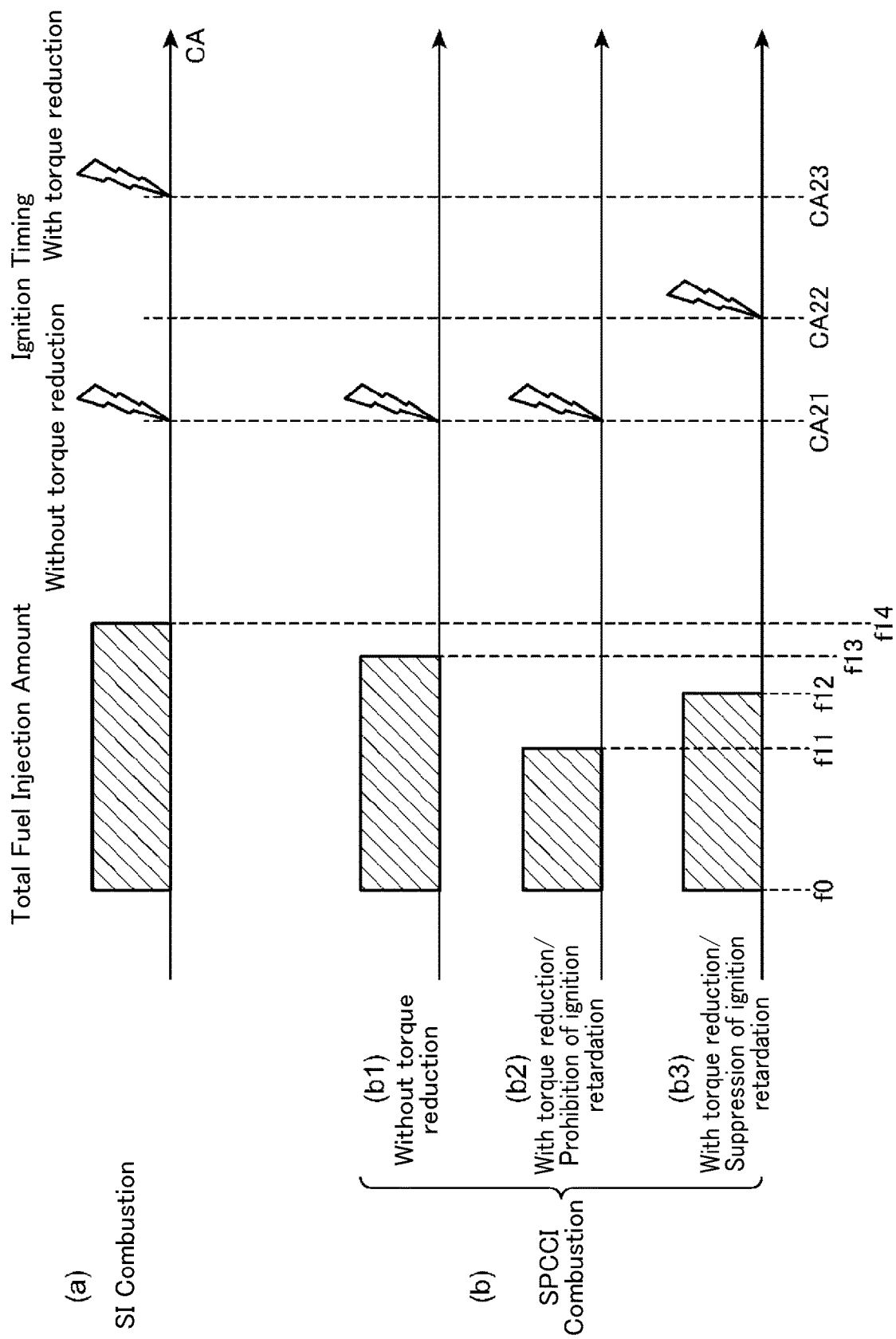

ENGINE CONTROL METHOD AND ENGINE SYSTEM

TECHNICAL FIELD

The present invention relates to a control method for an engine configured such that a part of an air-fuel mixture is combusted in spark ignition (SI) combustion, and the remainder is combusted by self-ignition, i.e., in compression ignition (CI) combustion, wherein the engine is capable of changing its output torque (torque to be generated) according to a steering angle, and an engine system using the control method.

BACKGROUND ART

There has been known premixed charge compression ignition combustion (or homogenous charge compression ignition combustion) in which a mixture of air and gasoline fuel is sufficiently compressed in a cylinder so as to be combusted by self-ignition. Further, there has been proposed partially premixed charge compression ignition combustion (hereinafter referred to as "spark controlled compression ignition (SPCCI) combustion" which is a combination of spark ignition (SI) combustion and compression ignition (CI) combustion, instead of combusting the entirety of an air-fuel mixture by self-ignition (see, for example, the following Patent Document 1). In the SPCCI combustion, a part of an air-fuel mixture is forcibly combusted by flame propagation triggered by spark ignition (SI combustion), and then the remaining unburned air-fuel mixture is combusted by self-ignition (CI combustion).

Meanwhile, there has also be known driving support control of comprehensively controlling accelerations (G) in a forward-rearward (longitudinal) direction and a width (lateral) direction of a vehicle by changing an output torque of an engine according to a steering angle (this control will hereinafter be referred to as "vehicle attitude control"). In the vehicle attitude control, immediately after a driver starts to turn a steering wheel, the output torque of the engine is reduced to be less than a required torque, to generate a deceleration G in the vehicle, thereby causing a load shift toward front road wheels. This results in increases in tire gripping force and cornering force of the front road wheels. In the vehicle attitude control, the engine output torque is reduced by means of, e.g., retardation of an ignition timing at which an air-fuel mixture is ignited by a spark plug (ignition retardation).

CITATION LIST

Parent Document

Patent Document 1: JP 2001-073775A
Patent Document 2: JP 6112304B

SUMMARY OF INVENTION

Technical Problem

There is a demand to execute the vehicle attitude control in a vehicle mounting an engine capable of the SPCCI combustion. However, if, in a situation where the SPCCI combustion is performed, the engine output torque is reduced by the ignition retardation so as to execute the vehicle attitude control, an in-cylinder pressure is likely to fail to rise up to a value required for the CI combustion in a late phase of the SPCCI combustion, resulting in the occurrence of misfire.

It is an object of the present invention to provide an engine control method capable of executing the vehicle attitude control without exerting an influence on combustion performance of the SPCCI combustion, and an engine system using the engine control method.

Solution to Technical Problem

According to one aspect of the present invention, there is provided a control method for an engine which is mounted to a vehicle having steerable road wheels and mechanically coupled to drive road wheels of the vehicle, and which includes a spark plug, the control method comprising: a combustion mode setting step of selecting, a combustion mode of the engine between a first combustion mode in which an entirety of an air-fuel mixture in a cylinder of the engine is combusted by a propagation of a flame produced by the spark plug, and a second combustion mode in which at least a part of an air-fuel mixture in the cylinder is combusted by a self-ignition, on the basis of an operating state of the engine; a decremental torque setting step of setting a torque reduction amount by which an output torque of the engine is to be reduced, on the basis of a steering angle of the steerable road wheels; a torque reduction step of executing a retardation control for controlling the spark plug so as to retard an ignition timing based on the torque reduction amount set in the decremental torque setting step, when the first combustion mode is selected in the combustion mode setting step; and a suppression step of executing a retardation suppression control for suppressing a degree of the retardation control based on the torque reduction amount set in the decremental torque setting step, when the second combustion mode is selected in the combustion mode setting step.

According to another aspect of the present invention, there is provided an engine system comprising: an engine mounted to a vehicle having steerable road wheels and mechanically coupled to drive road wheels of the vehicle, the engine including a spark plug; an operating state sensor configured to detect an operating state of the engine; a steering angle sensor configured to detect a steering angle of the steerable road wheels; and a controller, wherein the controller is configured to: select a combustion mode of the engine between a first combustion mode in which an entirety of an air-fuel mixture in a cylinder of the engine is combusted by a propagation of a flame produced by the spark plug, and a second combustion mode in which at least a part of an air-fuel mixture in the cylinder is combusted by a self-ignition, on the basis of a detection result by the operating state sensor; set a torque reduction amount by which an output torque of the engine is to be reduced, on the basis of a detection result by the steering angle sensor; execute a retardation control for controlling the spark plug so as to retard an ignition timing based on the set torque reduction amount, when the first combustion mode is selected; and execute a control for suppressing a degree of the retardation control based on the set torque reduction amount, when the second combustion mode is selected.

In the control method or the engine system of the present invention, the torque reduction amount is set based on the steering angle of the steerable road wheels. This operation is equivalent to execution of the vehicle attitude control. Further, the first combustion mode is equivalent to the SI combustion, and the second combustion mode is equivalent to the SPCCI combustion. Then, when the first combustion mode is selected as the combustion mode, the retardation control is executed to reduce the output torque of the engine by the set torque reduction amount, by means of retardation of the ignition timing (torque reduction step). This operation is equivalent to torque reduction by ignition retardation.

On the other hand, when the second combustion mode is selected as the combustion mode, the retardation suppression control is executed to suppress the degree of the retardation control (suppression step). Specifically, during the SPCCI combustion, the vehicle attitude control is executed by means of suppressed ignition retardation, instead of the normal ignition retardation. Thus, in the retardation suppression control, the start timing of the SI combustion in the SPCCI combustion is not so largely retarded as compared to the normal retardation control. Therefore, an in-cylinder temperature and an in-cylinder pressure are sufficiently raised by heat generated by the SI combustion, so that it is possible to generate the CI combustion in the late phase of the SPCCI combustion in a good manner without causing the occurrence of misfire.

Preferably, the control method of the present invention further comprises an air/fuel ratio mode setting step of, when the second combustion mode is selected in the combustion mode setting step, selecting an air/fuel ratio mode between a first air/fuel ratio mode in which the air-fuel mixture is set to be leaner than a stoichiometric air/fuel ratio, and a second air/fuel ratio mode in which the air-fuel mixture is set to be equal to or richer than the stoichiometric air/fuel ratio, on the basis of the operating state of the engine, wherein the retardation suppression control in the suppression step is executed when the first air/fuel ratio mode is selected in the air/fuel ratio mode setting step.

If the retardation control is executed during the first air/fuel mode, the lean air-fuel mixture causes difficulty in inducing self-ignition, so that the possibility of misfire becomes higher. According to the above feature, when the vehicle attitude control is executed in a situation where the SPCCI combustion is performed in the first air/fuel ratio mode, the retardation suppression control is executed, so that it is possible to effectively suppress misfire.

Preferably, the control method of the present invention further comprises an air/fuel ratio mode setting step of, when the second combustion mode is selected in the combustion mode setting step, selecting an air/fuel ratio mode between a first air/fuel ratio mode in which the air-fuel mixture is set to be leaner than a stoichiometric air/fuel ratio, and a second air/fuel ratio mode in which the air-fuel mixture is set to be equal to or richer than the stoichiometric air/fuel ratio, on the basis of the operating state of the engine, wherein the retardation control in the torque reduction step is executed when the second air/fuel ratio mode is selected in the air/fuel ratio mode setting step.

When the air-fuel mixture is lean, the possibility of misfire becomes higher, and, on the other hand, in the second air/fuel ratio mode in which the air-fuel mixture is formed to have an air/fuel ratio equal to or less than the stoichiometric air/fuel ratio, the possibility of misfire becomes relatively low even if the retardation control is executed. According to the above feature, when the vehicle attitude control is executed in a situation where the SPCCI combustion is performed in the second air/fuel ratio mode, the normal retardation control is employed for the torque reduction, instead of the retardation suppression control. Therefore, it is possible to limit a range in which the vehicle attitude control is executed by the retardation suppression control which is a control mode different from the normal or proper control mode, thereby simplifying the control scheme for the vehicle attitude control.

In the control method of the present invention, the retardation suppression control may be configured to prohibit the retardation of the ignition timing of the spark plug. According to this feature, the ignition retardation is completely avoided, so that it is possible to dispel concern about misfire. In this case, the reduction of the engine output torque for the vehicle attitude control is substituted by another control, such as control of reducing the amount of fuel to be supplied into a cylinder.

In the control method of the present invention, the retardation suppression control may be configured to limit a degree of the retardation of the ignition timing of the spark plug. According to this feature, the degree of the ignition retardation can be reduced to suppress the possibility of misfire.

Effect of Invention

The present invention can provide an engine control method capable of executing the vehicle attitude control without exerting an influence on combustion performance of the SPCCI combustion, and an engine system using the engine control method.

BRIEF DESCRIPTION OF DRAWINGS

FIGS. 10(A) and 10(B) are flowcharts schematically showing the engine control method according to this embodiment.

FIG. 18 is a tabular diagram showing one modification of retardation suppression control.

DESCRIPTION OF EMBODIMENTS

[Structure of Vehicle]

Figure 1:
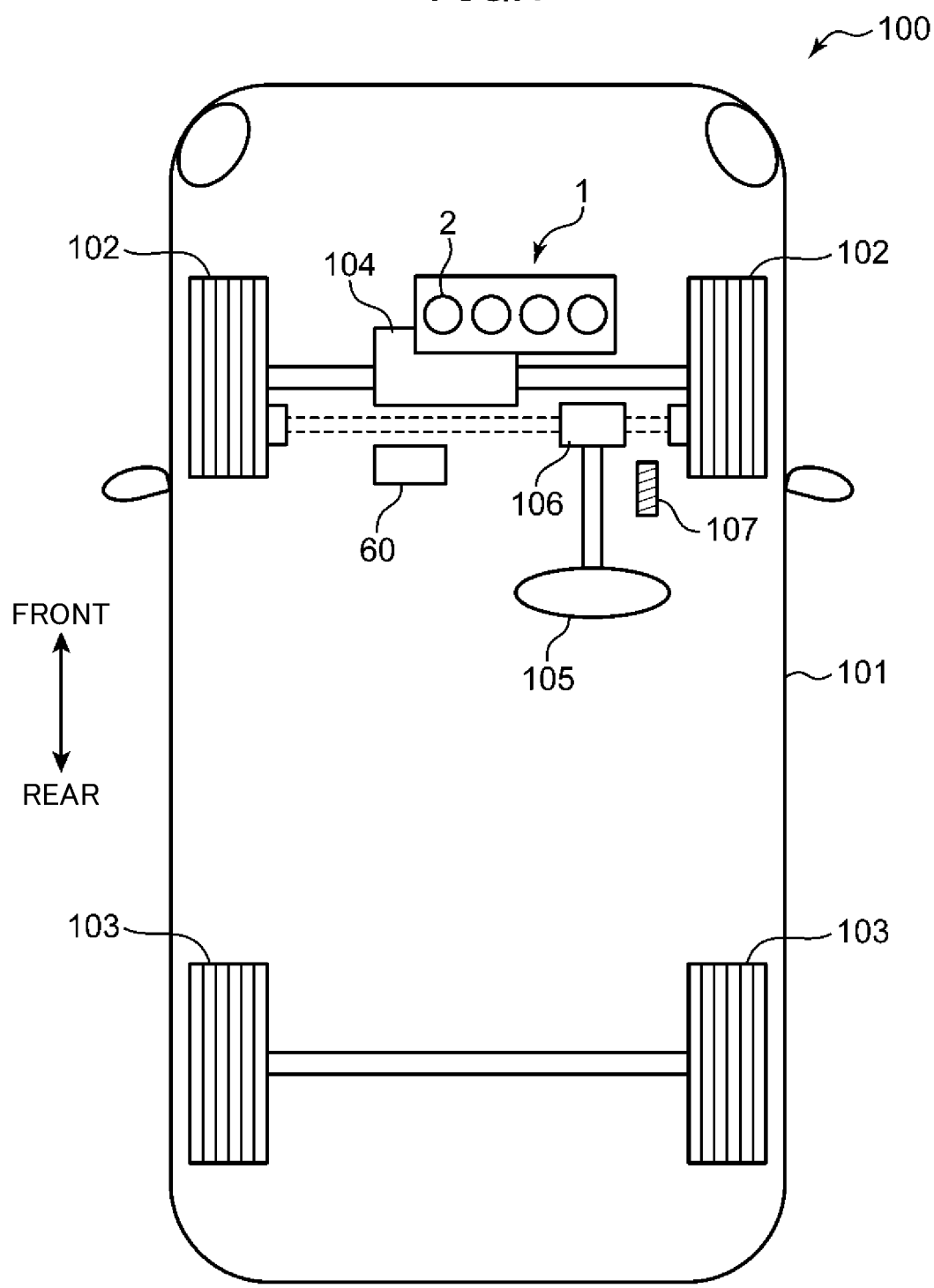
FIG. 1 is a schematic diagram of a vehicle using an engine control method and an engine system according to one embodiment of the present invention.

An embodiments of the present invention will now be described in detail based on the drawings. First of all, with reference to FIG. 1, the structure of a vehicle 100 using an engine control method and an engine system according to one embodiment of the present invention will be schematically described. The vehicle 100 pertaining to this embodiment is a front-engine, front-wheel drive (FF) vehicle, and is equipped with an engine 1 as a driving source. The engine 1 is an in-line four-cylinder gasoline engine which has four cylinders 2 and is capable of spark ignition (SI) combustion and spark controlled compression ignition (SPCCI) combustion.

The vehicle 100 comprises: a vehicle body 101 mounting the engine 1; two front road wheels 102 serving as drive road wheels and steerable road wheels; and two rear road wheels 103 serving as driven road wheels. A driving force generated by the engine 1 is transmitted to the front road wheels 102 via a transmission 104. The vehicle 100 is also equipped with a steering wheel 105 for steering the front wheels 102, and a power steering unit 106 for assisting manipulation of the steering wheel 105. Further, the vehicle 100 is equipped with an accelerator pedal 107 configured to be manipulated by a driver and to adjust the degree of opening of the after-mentioned throttle valve 32.

The vehicle 100 is equipped with an ECU 60 (controller) for electronically controlling the engine 1. The ECU 60 in this embodiment is configured to be capable of executing vehicle attitude control when the driver manipulates the steering wheel 105. In the vehicle attitude control, immediately after the driver starts to turn the steering wheel 105, an output torque to be generated from the engine 1 is reduced to be less than a required torque determined by a depression amount (relative position) of the accelerator pedal 107 or the like, to generate a deceleration G in the vehicle 100, thereby causing a load shift toward the front road wheels 102. This results in increases in tire gripping force and cornering force of the front road wheels 102. The vehicle attitude control and the SPCCI combustion will be described in detail later.

[Engine System]

Figure 2:
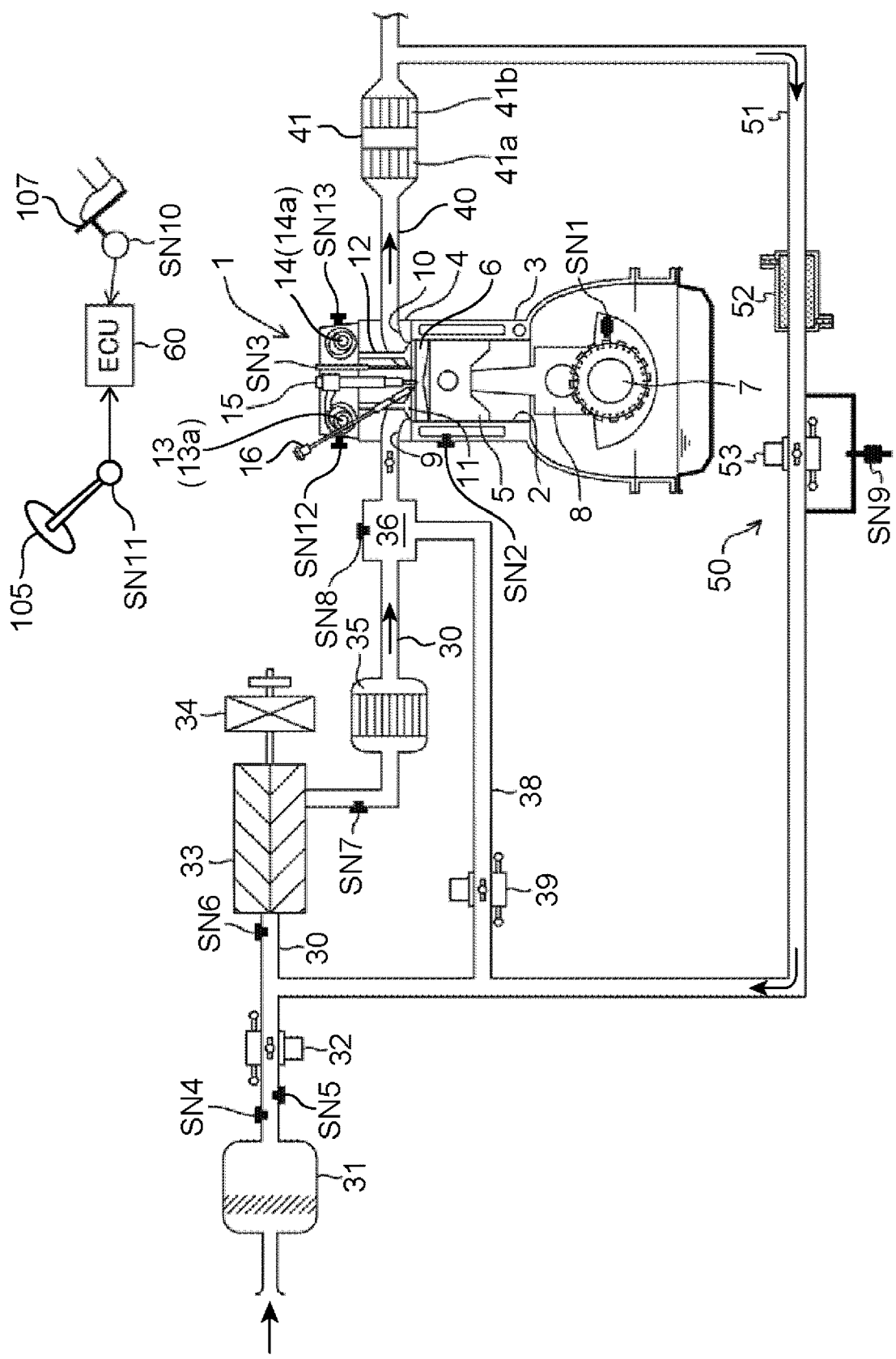
FIG. 2 is a system diagram showing the entire configuration of a compression ignition engine using the engine control method according to this embodiment.

Next, the engine system equipped in the vehicle 100 will be described. FIG. 2 is a diagram showing the entire configuration of the engine system according to this embodiment. This engine system comprises the engine 1 composed of a four-stroke direct gasoline-injection engine, wherein the engine 1 comprises: an engine body; an intake passage 30 for allowing intake air to flow therethrough so as to be introduced into the engine body, an exhaust passage 40 for allowing exhaust gas to flow therethrough so as to be discharged from the engine body, and an EGR device 50 for allowing the exhaust gas flowing through the exhaust passage 40 to be partly recirculated to the intake passage 30.

The engine 1 is used as a driving source of the vehicle 100. In this embodiment, the engine 1 is of a type to be driven by receiving supply of fuel consisting mainly of gasoline. Here, the fuel may be gasoline containing bioethanol or the like. The engine 1 comprises a cylinder block 3, a cylinder head 4, and four pistons 5. The cylinder block 3 has four cylinder liners each forming therein a respective one of the cylinders. The cylinder head 4 is attached to an upper surface of the cylinder block 3 to close upper openings of the cylinders 2. Each of the pistons 5 is received in a respective one of the cylinders 2 in a reciprocatingly slidable manner, and coupled to a crankshaft 7 via a connecting rod 8. The crankshaft 7 is configured to be rotated about a central axis thereof according to reciprocating movement of the pistons 5.

A combustion chamber 6 is defined above each of the pistons 5. The above fuel is injected and supplied from the after-mentioned injector 15 into the combustion chamber 6. Then, a mixture of air and the supplied fuel is combusted in the combustion chamber 6, so that the piston 5 pushed downwardly by an expansive force of the combustion will be reciprocatingly moved in an upward-downward direction. A geometric compression ratio of the cylinder 2, i.e., a ratio of the volume of the combustion chamber 6 as measured when the piston 5 is at a top dead center position to the volume of the combustion chamber 6 as measured when the piston 5 is at a bottom dead center position, is set to a high compression ratio of 13 to 30 (e.g., about 20) so as to become suited to the SPCCI combustion.

The cylinder block 3 is installed with a crank angle sensor SN1 and a water temperature sensor SN2. The crank angle sensor SN1 is configured to detect a rotational angle of the crankshaft 7 (crank angle), and a rotational speed of the crankshaft 7 (engine speed). The water temperature sensor SN2 is configured to detect the temperature of cooling water flowing through the cylinder block 3 and the cylinder head 4 (engine water temperature).

In each of the cylinders 2, the cylinder head 4 is formed with an intake port 9 and an exhaust port 10 each communicated with the combustion chamber 6. A bottom surface of the cylinder head 4 serves as a ceiling surface of the combustion chamber 6. This ceiling surface of the combustion chamber is formed with an intake-side opening which is a downstream end of the intake port 9, and an exhaust-side opening which is an upstream end of the exhaust port 10. Further, an intake valve 11 for opening and closing the intake-side opening and an exhaust valve 12 for opening and closing the exhaust-side opening are assembled to the cylinder head 4. Although illustration is omitted, a valve arrangement of the engine 1 is an intake-side two-valve×exhaust-side two-valve, four-valve type in which each of the intake port 9 and the exhaust port 10 is provided by a number of two (one pair) per cylinder 2, and each of the intake value 11 and the exhaust valve 12 is also provided by a number of two (one pair) per cylinder 2.

The cylinder head 4 is provided with an intake-side valve operating mechanism 13 and an exhaust-side valve operating mechanism 14 each comprising a camshaft. Each of the pair of intake valves 11 and the pair of exhaust valves 12 is configured to be driven by a corresponding one of the valve operating mechanisms 13, 14 in an openable and closeable manner, interlockingly with the rotation of the crankshaft 7. The intake-side valve operating mechanism 13 has a built-in intake-side variable valve timing mechanism (intake VVT) 13a capable of changing at least a valve opening timing of the pair of intake valves 11. Similarly, the exhaust-side valve operating mechanism 14 has a built-in exhaust-side variable valve timing mechanism (exhaust VVT) 14a capable of changing at least a valve closing timing of the pair of exhaust valves 12. By controlling the intake VVT 13a and the exhaust VVT 14a, it is possible to adjust a valve overlap period during which both the pair of intake valves 11 and the pair of exhaust valves 12 are maintained in an open state across top dead center of an exhaust stroke. Further, by adjusting the valve overlap period, it is possible to adjust the amount of burned gas (internal EGR gas) remaining in the combustion chamber 6.

In each of the cylinders 2, the cylinder head 4 is further provided with an injector 15 (fuel injector) and a spark plug 16. The injector 15 is configured to inject (supply) fuel into the cylinder 2 (combustion chamber 6). As the injector 15, it is possible to use a multi-hole injector capable of injecting fuel in a radial pattern from a plurality of nozzle holes formed at a distal end thereof. The injector 15 is disposed such that the distal end thereof is exposed to the inside of the combustion chamber 6, and opposed to a radially central region of a crown surface of the piston 5.

The spark plug 16 is disposed at a position slightly offset toward the intake side with respect to the injector 15, and a distal end (electrode) thereof is disposed at a position facing the inside of the cylinder 2. The spark plug 16 is a forced ignition source for igniting an air-fuel mixture formed in the cylinder 2 (combustion chamber 6).

The cylinder head 4 is installed with an in-cylinder pressure sensor SN3, an intake cam angle sensor SN12 and an exhaust cam angle sensor SN13 each serving as a sensing element. The in-cylinder pressure sensor SN3 is configured to detect an internal pressure of the combustion chamber 6 in each of the cylinders 2 (in-cylinder pressure). The intake cam angle sensor SN12 is configured to detect a rotational position of the camshaft (cam angle) of the intake-side valve operating mechanism 13, and the exhaust cam angle sensor SN13 is configured to detect a rotational position of the camshaft (cam angle) of the exhaust-side valve operating mechanism 14.

As shown in FIG. 2, the intake passage 30 is connected to one lateral surface of the cylinder head 4, in such a manner as to be communicated with the pair of intake ports 9 in each of the cylinders 2. Air (flesh air) taken from an upstream end of the intake passage 30 is introduced into the combustion chamber 6 through the intake passage 30 and the pair of intake ports 9. The intake passage 30 is provided with an air cleaner 31, a throttle valve 32, a supercharger 33, an electromagnetic clutch 34, an intercooler 35, and a surge tank 36, which are arranged in this order from the upstream end thereof.

The air cleaner 31 is configured to remove foreign substances contained in intake air, thereby cleaning the intake air. The throttle valve 32 is configured to open and close the intake passage 30, interlockingly with a depressing movement of the accelerator pedal 107, thereby adjusting the flow rate of intake air in the intake passage 30. The supercharger 33 is configured to compress intake air and send the compressed intake air toward a downstream end of the intake passage 30. The supercharger 33 is a mechanical supercharger mechanically coupled to the engine 1, and configured such that engagement with the engine 1 and release of the engagement are switched by the electromagnetic clutch 34. When the electromagnetic clutch 34 is engaged, a driving force is transmitted from the engine 1 to the supercharger 33, to drive the supercharger 33 to perform supercharging. The intercooler 35 is configured to cool the intake air compressed by the supercharger 33. The surge tank 36 is a tank disposed immediately upstream of a non-illustrated intake manifold to provide a space for equally distributing intake air to the four cylinders 2.

The intake passage 30 is provided with: an air flow sensor SN4 to detect the flow rate of intake air; first and second intake temperature sensors SN5, SN7 to detect the temperature of intake air; first and second intake pressure sensors SN6, SN8 to detect the pressure of intake air, in respective regions thereof. The air flow sensor SN4 and the first intake temperature sensor SN5 are disposed in a region between the air cleaner 31 and the throttle valve 32 in the intake passage 30 to detect the flow rate and the temperature of intake air passing through the region, respectively. The first intake pressure sensor SN6 is disposed in a region between the throttle valve 32 and the supercharger 33 (downstream of a connection with a downstream end of the after-mentioned EGR passage 51) in the intake passage 30, to detect the pressure of intake air passing through the region. The second intake temperature sensor SN7 is disposed in a region between the supercharger 33 and the intercooler 35 in the intake passage 30 to detect the temperature of intake air passing through the region. The second intake pressure sensor SN8 is disposed in the surge tank 36 to detect the pressure of intake air inside the surge tank 36.

The intake passage 30 includes a bypass passage 38 for sending intake air to the combustion chambers 6 while bypassing the supercharger 33. The bypass passage 38 mutually connects the surge tank 36 and the vicinity of the downstream end of the after-mentioned EGR passage 51. The bypass passage 38 is provided with a bypass valve 39 capable of selectively opening and closing the bypass passage 38.

The exhaust passage 40 is connected to the other lateral surface of the cylinder head 4, in such a manner as to be communicated with the pair of exhaust ports 10 in each of the cylinders 2. Burned gas (exhaust gas) produced in the combustion chamber 6 is discharged to the outside of the vehicle 100 through the pair of exhaust ports 10 and the exhaust passage 40. The exhaust passage 40 is provided with a catalytic converter 41. The catalytic converter 41 houses a three-way catalyst 41a for purifying harmful components (HC, CO, NOx) contained in exhaust gas flowing through the exhaust passage 40, and a gasoline particulate filter (GPF) 41b for capturing particulate matter (PM) contained in the exhaust gas.

The EGR device 50 comprises: an EGR passage 51 connecting the exhaust passage 40 and the intake passage 30; and an EGR cooler 52 and an EGR valve 53 each provided in the EGR passage 51. The EGR passage 51 mutually connects a region of the exhaust passage 40 located downstream of the catalytic converter 41 and a region of the intake passage 30 located between the throttle valve 32 and the supercharger 33. The EGR cooler 52 is configured to cool exhaust gas (external EGR gas) which is being recirculated from the exhaust passage 40 to the intake passage 30 through the EGR passage 51, in a heat-exchanging manner. The EGR valve 53 is provided in the EGR passage 51 in a selectively openable and closable manner at a position downstream of the EGR cooler 52 to adjust the flow rate of exhaust gas flowing through the EGR passage 51. The EGR passage 51 is installed with a pressure difference sensor SN9 to detect a difference between the pressure of the external EGR gas at a position upstream of the EGR valve 53 and the pressure of the external EGR gas at a position downstream of the EGR valve 53.

The accelerator pedal 107 is provided with an accelerator position sensor SN10 to detect the relative position of the accelerator pedal 107 (accelerator positon) (to serve as one operating state sensor). Specifically, the accelerator position sensor SN10 is a sensor to detect the degree of depression of the accelerator pedal 107, and also a sensor to detect driver's acceleration/deceleration manipulation. The steering wheel 105 is associated with a steering angle sensor SN11. The steering angle sensor SN11 is configured to detect a steering angle of the front wheels 102 based on a rotation angle of the steering wheel 105. It should be understood that it is possible to use any other type of steering angle sensor capable of detecting a steering angle of the front wheels 102.

[Control Configuration]

Figure 3:
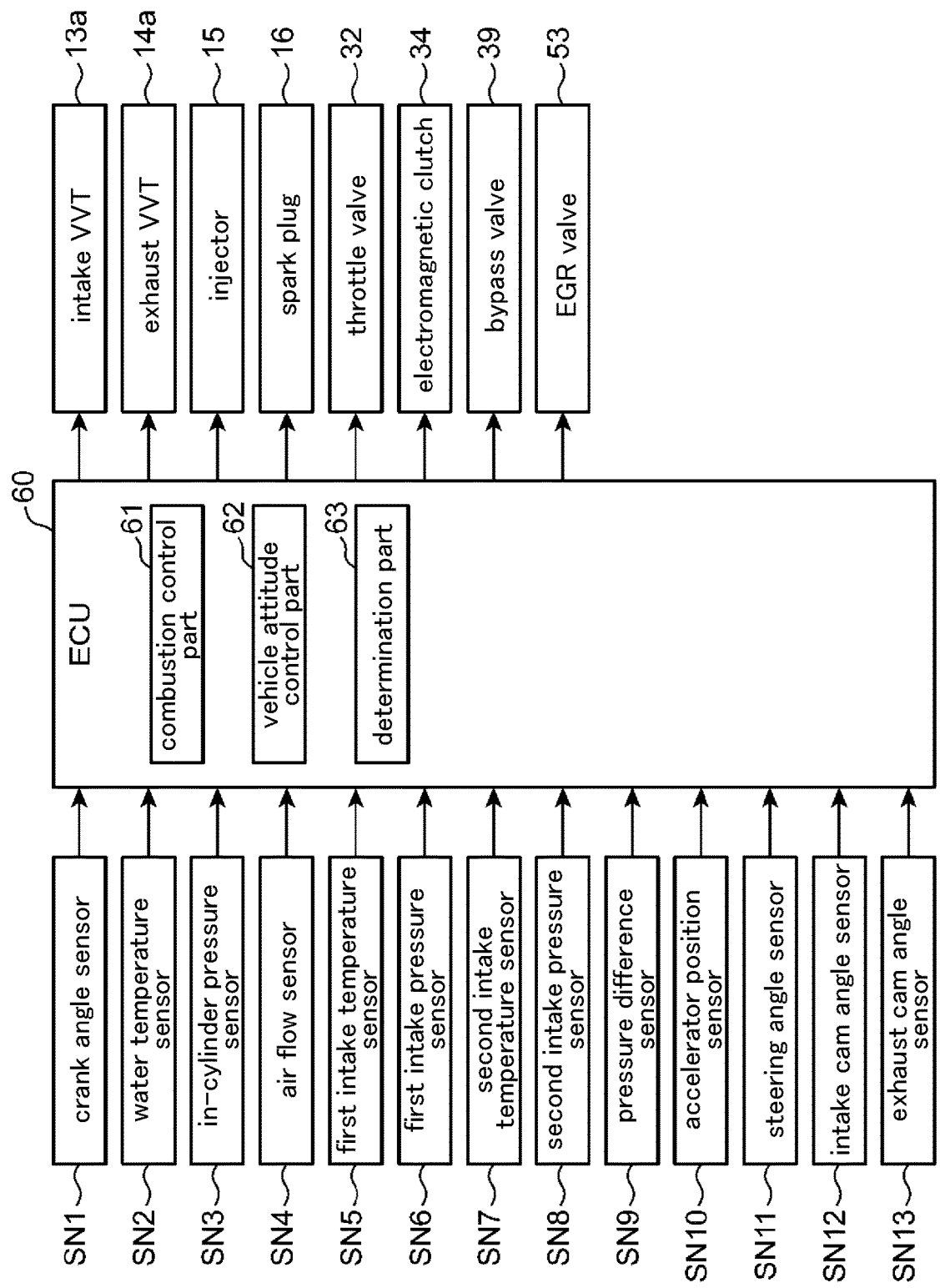
FIG. 3 is a block diagram showing a control system of the compression ignition engine.

FIG. 3 is a block diagram showing a control configuration of the engine system. The engine system according to this embodiment is comprehensively controlled by the ECU (engine control module) 60. The ECU 60 is a microprocessor which comprises a CPU, a ROM and a RAM.

The ECU 60 is configured to accept an input of detection signals from various sensors installed in the vehicle 100. The ECU 60 is electrically connected with the crank angle sensor SN1, the water temperature sensor SN2, the in-cylinder pressure sensor SN3, the air flow sensor SN4, the first and second intake temperature sensors SN5, SN7, the first and second intake pressure sensors SN6, SN8, the pressure difference sensor SN9, the accelerator position sensor SN10, the steering angle sensor SN11, the intake cam angle sensor SN12 and the exhaust cam angle sensor SN13. Plural pieces of information detected by these sensors SN1 to SN13, i.e., information such as the crank angle, the engine speed, the engine water temperature, the in-cylinder pressure, the intake air flow rate, the intake air temperature, the intake air pressure, the pressure difference before and after the EGR valve 53, the accelerator position, the steering angle and the intake and exhaust cam angles, are sequentially input to the ECU 60.

The ECU 60 is operable to control each part of the engine while executing various determinations and computations based on input signals from the sensors SN1 to SN13 and others. Specifically, the ECU 60 is electrically connected to the intake VVT 13a, the exhaust VVT 14a, the injector 15, the spark plug 16, the throttle valve 32, the electromagnetic clutch 34, and the bypass valve 39, the EGR valve 53, and others, and is operable, based on results of the computations, etc., to output control signals, respectively, to these devices.

Figure 4:
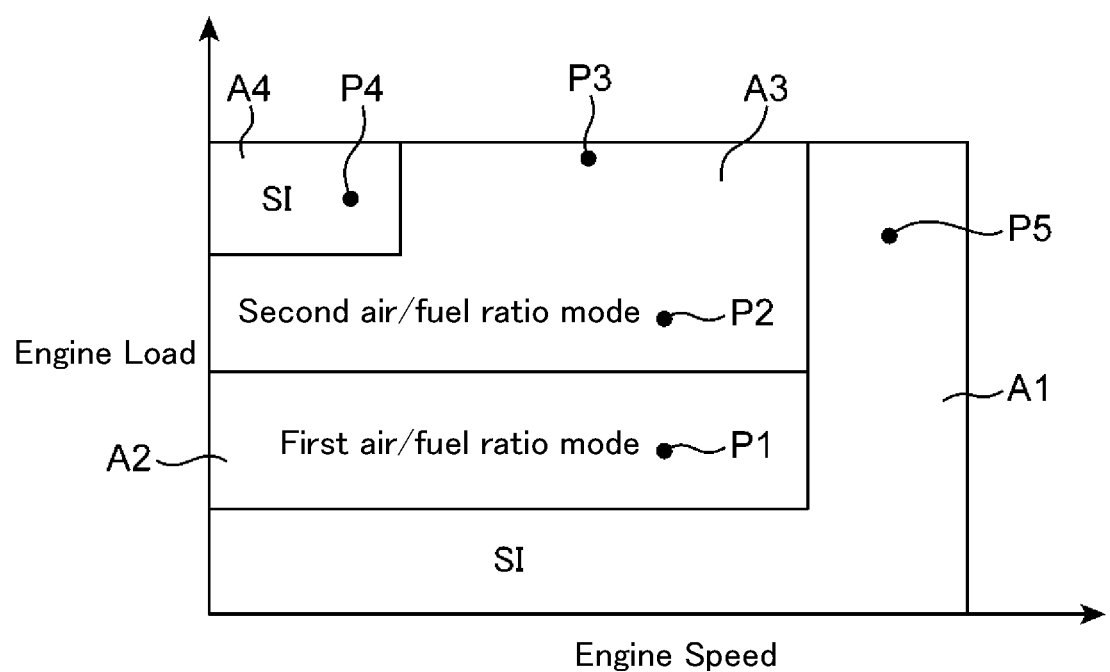
FIG. 4 is an operating range map for explaining different combustion controls according to an engine speed and an engine load.

The ECU 60 functionally comprises a combustion control part 61, a vehicle attitude control part 62 and a determination part 63. The combustion control part 61 is operable to control a fuel injection operation of the injector 15, and an ignition operation of the spark plug 16. For example, the combustion control part 61 is operable, based on the engine speed detected by the crank angle sensor SN1, an engine load (required torque) identified from the relative position of the accelerator pedal 107 detected by the accelerator position sensor SN10, and the intake air flow rate detected by the air flow sensor SN4, to determine a fuel injection amount and a fuel injection timing of the injector 15, and an ignition timing of the spark plug 16, and drive the injector 15 and the spark plug 16 in accordance with the resulting determined values. In this process, the combustion control part 61 operates to refer to a predetermined operating range map (one example thereof is shown in FIG. 4) to select a combustion mode. Although the details will be described later, the combustion mode includes a combustion mode in which the injector 15 and the spark plug 16 are driven to cause an air-fuel mixture in each cylinder 2 to be self-ignited at a given timing (SPCCI combustion).

The vehicle attitude control part 62 is operable to execute the vehicle attitude control configured to change the output torque of the engine 1 according to the steering angle of the front road wheels 102 responsive to manipulation of the steering wheel 105. For example, the vehicle attitude control part 62 is operable to refer to a detection value of the steering angle sensor SN11, and, when the steering angle is increased by a given amount or more within a given time period, to determine that the vehicle 100 is in a turning (cornering) state, and execute control of reducing the output torque. In this embodiment, at least two controls: retardation control of retarding the ignition timing of the spark plug 16 (torque reduction step); and fuel amount reduction control of reducing the amount of fuel to be supplied into each cylinder 2, are employed as means for the torque reduction, and one or both of the two controls are employed according to operating modes. Here, the vehicle attitude control part 62 is operable to execute each of the controls such that, as a torque reduction amount required in the vehicle attitude control becomes larger, the ignition timing is more largely retarded, or the fuel injection amount is more largely reduced.

The determination part 63 is operable to determine whether or not combustion in the combustion chamber 6 is likely to come into a state in which it is unstable or there is a possibility of misfire (combustion unstable state). In this embodiment, combustion control (including control of the SPCCI combustion) by the combustion control part 61 and the vehicle attitude control by the vehicle attitude control part 62 are overlappingly executed. If the two controls are overlappingly executed under certain conditions, the combustion unstable state can be caused. Further, the determination part 63 is operable, when the combustion state is determined to be likely to come into the combustion unstable state, to execute control of changing a control mode of the combustion control or the vehicle attitude control.

[Combustion Control]

Next, the combustion control to be executed by the combustion control part 61 will be described in detail. FIG. 4 is a simplified operating range map for explaining different combustion controls according to an engine speed and an engine load. This operating range map shows four operating ranges: a first range A1; a second range A2; a third range A3; and a fourth range A4. The first range A1 is a combination of a range in which the engine speed is in a low and intermediate region, and the engine load is in a low (including no load) region, and a range in which the engine speed is in a high region, and the engine load is in an intermediate and high region. The second range A2 is a range (low and intermediate speed-intermediate load range) in which the engine speed is in the low and intermediate region, and the engine load is in a region higher than that of the first range A1. The third range A3 is a range (low and intermediate speed-high load range) in which the engine speed is in the low and intermediate region, and the engine load is in a region higher than that of the second range A2. The fourth range A4 is a range in which the engine speed is in the low region, and the engine load is close to a full-load line.

In the first range A1 and the fourth range A4, the SI combustion (first combustion mode) is performed. The SI combustion is a combustion type in which an air-fuel mixture in the combustion chamber 6 is ignited by spark ignition using the spark plug 16, and forcibly combusted by flame propagation causing expansion of a combustion region from the ignition point toward surroundings thereof. That is, the SI combustion is a combustion mode in which the entire air-fuel mixture in each cylinder 2 is combusted by propagation of flame produced by the spark plug 16.

In the second range A2 and the third range A3, the SPCCI combustion (second combustion mode) is performed. The SPCCI combustion is a combination of the SI combustion and the CI combustion. The CI combustion is a combustion type in which an air-fuel mixture is combusted by self-ignition in an environment where the air-fuel mixture is highly raised in temperature and pressure according to compression by the piston 5. The SPCCI combustion is a combustion type in which a part of an air-fuel mixture in the combustion chamber 6 is subjected to the SI combustion by spark ignition performed in an environment close to that causing self-ignition of the air-fuel mixture, and, after the SI combustion, the remaining air-fuel mixture in the combustion chamber 6 is subjected to the CI combustion by self-ignition (caused by higher temperature and pressure resulting from the SI combustion). That is, the SPCCI combustion is a combustion mode in which at least a part of an air-fuel mixture in each cylinder 2 is combusted by self-ignition.

In this embodiment, there are two air/fuel ratio modes: a first air/fuel ratio mode ($\lambda>1$) in which an air-fuel mixture formed in the combustion chamber 6 for the SPCCI combustion is set to be leaner than a stoichiometric air/fuel ratio; and a second air/fuel ratio mode ($\lambda\leq1$) in which the air-fuel mixture is set to be equal to or richer than the stoichiometric air/fuel ratio. More specifically, the first air/fuel ratio mode is a mode in which the SPCCI combustion is performed while an air/fuel ratio (A/F) as a weight ratio of air (fresh air) to fuel in the combustion chamber 6 is set to a value greater than the stoichiometric air/fuel ratio (14.7). On the other hand, the second air/fuel ratio mode is a mode in which the SPCCI combustion is performed while the air/fuel ratio (A/F) is set to be equal to the stoichiometric air/fuel ratio ($\lambda=1$) or slightly less than the stoichiometric air/fuel ratio ($\lambda<1$). In this embodiment, the air/fuel ratio A/F of an air-fuel mixture to be formed in the first air/fuel ratio mode is set in the range of about 25 to 30/1. Further, the air/fuel ratio A/F in the second air/fuel ratio is typically $\lambda=1$ or 14.7/1. For the SPCCI combustion, either one of the first air/fuel ratio mode ($\lambda>1$) or the second air/fuel ratio mode ($\lambda\leq1$) is selected based on the engine operating state (air/fuel ratio mode setting step).

Figure 5:
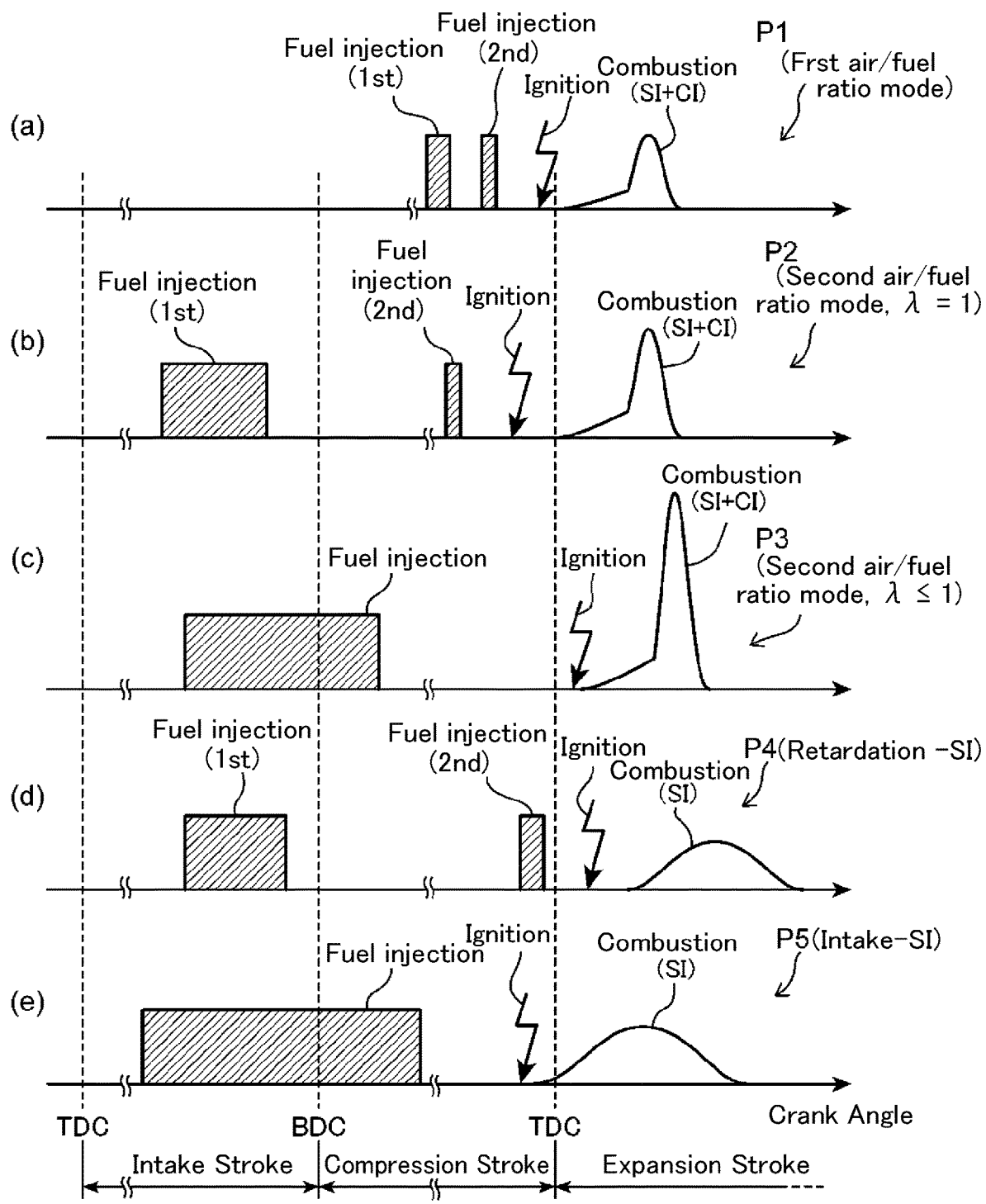
FIG. 5 illustrates time charts for schematically explaining combustion controls to be executed in respective ranges of the operating range map in FIG. 4.

FIG. 5 illustrates time charts for schematically explaining combustion controls to be executed in respective ranges A1 to A4 of the operating range map in FIG. 4. The chart (a) of FIG. 5 shows the fuel injection timing, the ignition timing and the combustion state (waveform of heat release rate) as measured when the engine is operated at an operating point P1 included in the second range A2 illustrated in FIG. 4. In the second range A2, the SPCCI combustion is performed in the first air/fuel ratio mode ($\lambda>1$).

The combustion control to be executed by the combustion control part 61 at the operating point P1 is as follows. As shown in the chart (a), the injector 15 is controlled to inject fuel during a period from an intermediate phase to a late phase of a compression stroke, in a manner divided into two stages: a 1st fuel injection; and a 2nd fuel injection. The spark plug 16 is controlled to ignite an air-fuel mixture at a timing adjacent to and on a slightly advance side with respect to top dead center of a compression stroke. This ignition triggers the start of the SPCCI combustion, so that a part of an air-fuel mixture in the combustion chamber is combusted (subjected to the SI combustion) by flame propagation, and the remaining air-fuel mixture is combusted (subjected to the CI combustion) by self-ignition.

Figure 6:
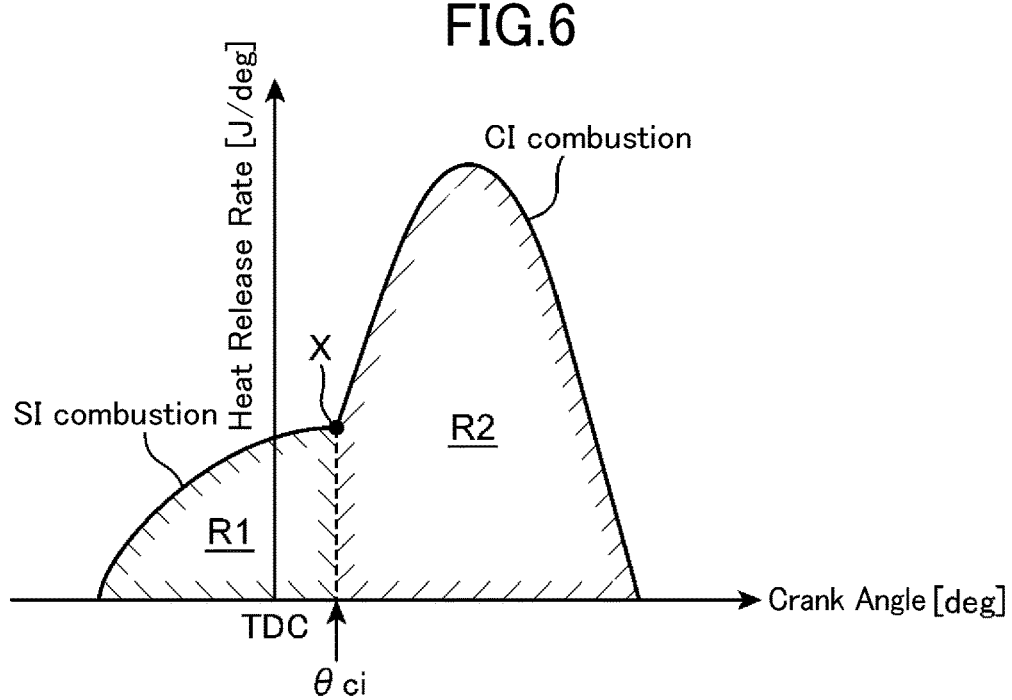
FIG. 6 is a graph showing a heat release rate during execution of spark controlled compression ignition (SPCCI) combustion.

Here, with reference to FIG. 6, advantages of the SPCCI combustion will be described. FIG. 6 is a graph showing the heat release rate during execution of the SPCCI combustion. The SPCCI combustion has a property that heat release increases more steeply when the CI combustion is developed than when the SI combustion is developed. Specifically, as shown in FIG. 6, in the SPCCI combustion, a rising slope in an early phase corresponding to the SI combustion is gentler than a rising slope in the subsequent phase corresponding to the CI combustion. When the SI combustion causes increases in internal temperature and pressure of the combustion chamber 6, the remaining unburned air-fuel mixture is self-ignited to start the CI combustion. At this timing when the CI combustion is started (the inflection point X in FIG. 6=crank angle $\theta ci$), the slope of a waveform of the heat release rate changes from gentle to steep. Further, in the SPCCI combustion, along with such a tendency of the heat release rate, an increase rate ($dp/d\theta$) of the internal pressure of the combustion chamber 6 appearing during the SI combustion is smaller than that appearing during the CI combustion.

After the start of the CI combustion, the SI combustion and the CI combustion are performed in parallel. In terms of a combustion speed of the air-fuel mixture, the CI combustion is greater than the SI combustion. Thus, the CI combustion exhibits a relatively large heat release rate. However, the slope of the waveform of this heat release rate never becomes excessive, because the CI combustion is developed after top dead center of a compression stroke. Specifically, after passing through top dead center of a compression stroke, a motoring pressure is lowered due to a downward movement of the piston 5, and thereby the rise of the heat release rate is suppressed, so that the situation where the $dp/d\theta$ during the CI combustion becomes excessive is avoided. As above, in the SPCCI combustion, by its property that the CI combustion is performed after the SI combustion, the $dp/d\theta$ serving as an index of combustion noise is less likely to become excessive, so that it is possible to suppress combustion noise, as compared to simple CI combustion (a case where the entire fuel is subjected to the CI combustion).

When the CI combustion is completed, the SPCCI combustion is also completed. The CI combustion is greater than the SI combustion in terms of the combustion speed. Thus, the SPCCI combustion is capable of advancing a combustion completion timing, as comparted to the simple CI combustion (the case where the entire fuel is subjected to the CI combustion). In other words, in the SPCCI combustion, it is possible to allow the combustion completion timing to come close to top dead center of a compression stroke, in an expansion stroke. This makes it possible to improve fuel economy performance in the SPCCI combustion, as compared to the simple SI combustion.

Returning to FIG. 5, the chart (b) shows the state of combustion control which is executed by the combustion control part 61 when the engine is operated at an operating point P2 included in the third range A3 illustrated in FIG. 4 (included in a relatively low load region of the third range A3). In the low load region of the third range A3, combustion of an air-fuel mixture adjusted to $\lambda=1$, which fall into the second air/fuel ratio mode ($\lambda\leq1$) in the SPCCI combustion, is performed.

At the operating point P2, the combustion control part 61 operates to cause the injector 15 to perform a first fuel injection for injecting fuel in an intake stroke in a relatively large amount, and subsequently perform a second fuel injection for injecting fuel in a compression stroke in an amount less than that of the first fuel injection. Further, the combustion control part 61 operates to cause the spark plug 16 to ignite an air-fuel mixture at a timing on a slightly advance side with respect to top dead center of the compression stroke. This ignition triggers the start of the SPCCI combustion, in the same manner as that at the operating point P1.

The chart (c) of FIG. 5 shows the state of combustion control which is executed by the combustion control part 61 when the engine is operated at an operating point P3 included in the third range A3 (included in a relatively high load region of the third range A3). In the high load region of the third range A3, control of subjecting, to the SPCCI combustion, an air-fuel mixture whose air/fuel ratio in the combustion chamber 6 is set to be slightly richer than the stoichiometric air/fuel ratio ($\lambda \leq 1$) is executed.

At the operating point P3, the combustion control part 61 operates to cause the injector 15 to inject the entirety or most part of fuel required per combustion cycle, in an intake stroke. For example, fuel is injected in a continuous period from a late phase of an intake stroke to an early phase of a compression stroke, as shown in the chart (c). Further, the combustion control part 61 operates to cause the spark plug 16 to ignite an air-fuel mixture at a timing on a slightly retard side with respect to top dead center of the compression stroke. This ignition triggers the start of the SPCCI combustion, in the same manner as that in the operating points P1, P2.

FIG. 5 shows one example in which an air-fuel mixture formed to have an air/fuel ratio equal to the stoichiometric air/fuel ratio ($\lambda=1$) and an air-fuel mixture formed to have an air/fuel ratio slightly richer than the stoichiometric air/fuel ratio ($\lambda \leq 1$) are selectively used depending on the engine load. Alternatively, an air-fuel mixture may be formed to have an air/fuel ratio equal to the stoichiometric air/fuel ratio ($\lambda=1$), in the entire third range A3. In the following description, this embodiment will be described on the assumption that, in the second air/fuel ratio mode to be performed in the third range A3, an air-fuel mixture having $\lambda=1$ is selected, and subjected to the SPCCI combustion.

The chart (d) of FIG. 5 shows the state of combustion control which is executed by the combustion control part 61 when the engine is operated at an operating point P4 included in the fourth range A4 as a low speed and high load range. In the fourth range A4, SI combustion by retardation of ignition timing (retardation SI) is performed, instead of the SPCCI combustion.

At the operating point P4, the combustion control part 61 operates to cause the injector 15 to perform a first fuel injection for injecting fuel in an intake stroke in a relatively large amount, and subsequently perform a second fuel injection for injecting fuel in a late phase of a compression stroke (immediately before top dead center of the compression stroke) in an amount less than that of the first fuel injection. Further, the combustion control part 61 operates to cause the spark plug 16 to perform ignition at a retarded timing. The ignition timing for an air-fuel mixture is set to a relatively largely retarded timing after top dead center of the compression stroke by about 5 to 20° CA. This ignition triggers the start of the SI combustion, and the entire air-fuel mixture in the combustion chamber 6 is combusted by flame propagation. Here, the reason that the ignition timing in the fourth range A4 is retarded in this manner is to prevent abnormal combustion such as knocking or preignition.

The chart (e) of FIG. 5 shows the state of combustion control which is executed by the combustion control part 61 when the engine is operated at an operating point P5 included in the high load and high speed region of the first range A1. In the first range A1, normal SI combustion (intake_SI) is performed, instead of the SPCCI combustion.

At the operating point P5, the combustion control part 61 operates to cause the injector 15 to inject fuel in a continuous period from an intake stroke to a compression stroke. Here, the operating point P5 is in high load and high speed conditions. Thus, the amount of fuel to be injected per combustion cycle is originally large, and a crank angle period necessary to inject a required amount of fuel is extended. On the other hand, in the intermediate and low load range, the fuel injection amount is reduced, as compared to that in the chart (e). Further, the combustion control part 61 operates to cause the spark plug 16 to ignite an air-fuel mixture at a timing on a slightly advance side with respect to top dead center of the compression stroke. This ignition triggers the start of the SI combustion, and the entire air-fuel mixture in the combustion chamber 6 is combusted by flame propagation.

[Vehicle Attitude Control]

Figure 7:
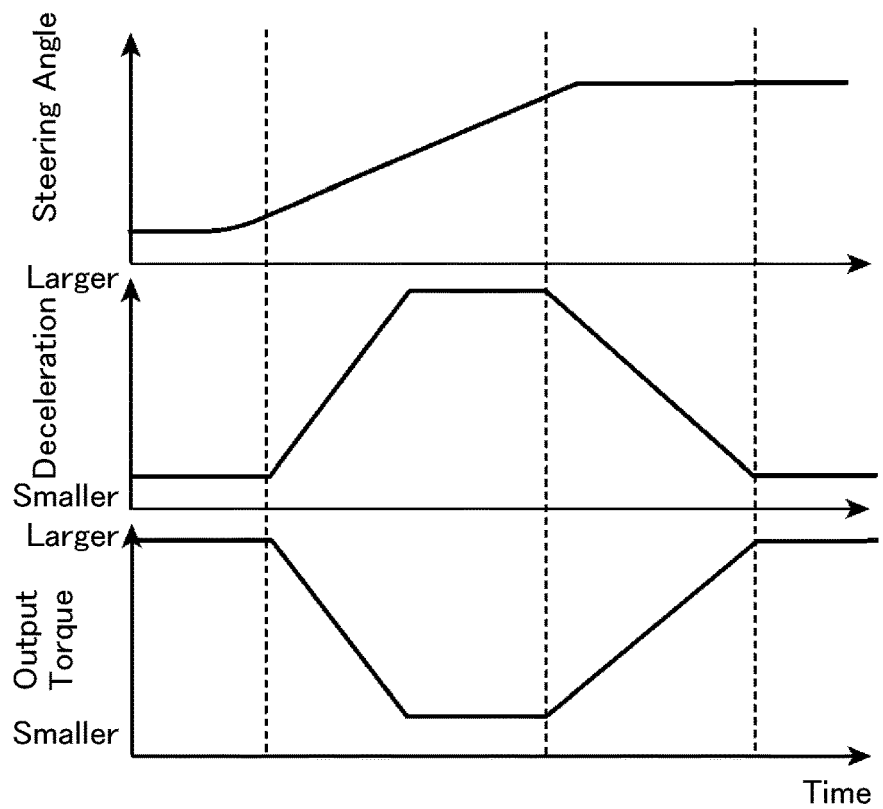
FIG. 7 illustrates time charts schematically showing a control state during vehicle attitude control.

Next, the vehicle attitude control to be executed by the vehicle attitude control part 62 will be described in detail. FIG. 7 illustrates time charts schematically showing a control state during vehicle attitude control in this embodiment. More specifically, FIG. 7 shows a relationship among the steering angle of the front road wheels 102 responsive to manipulation of the steering wheel 105, the deceleration of the vehicle 100 by the vehicle attitude control, and the output torque required for realizing the deceleration.

When the amount of change in the steering angle of the steering wheel 105 detected by the steering angle sensor SN11 becomes equal to or greater than a reference amount (a steering speed becomes equal to or greater than a given value), the vehicle attitude control part 62 operates to deem it to be a situation where the vehicle 100 is cornering, and gradually increase the deceleration. As previously described, an output torque to be produced by the engine 1 is reduced by the retardation control of retarding the ignition timing of the spark plug 16 or the fuel amount reduction control of reducing the amount of fuel to be supplied into each cylinder 2, thereby lowering the driving force of the vehicle 100 and increasing the deceleration of the vehicle 100.

Specifically, the vehicle attitude control part 62 operates to reduce the engine output torque, with respect to a target basic engine torque which is a required engine torque during normal operation, and determined based on a vehicle speed detected by the crank angle sensor SN1 and the relative position of the accelerator pedal 107 detected by the accelerator position sensor SN10. Then, when the steering speed becomes less than the given value, the vehicle attitude control part 62 operates to gradually reduce the deceleration. This makes it possible to increase a corning force of the front road wheels 102 during cornering, thereby allowing the vehicle 100 to be smoothly turned.

Figure 8:
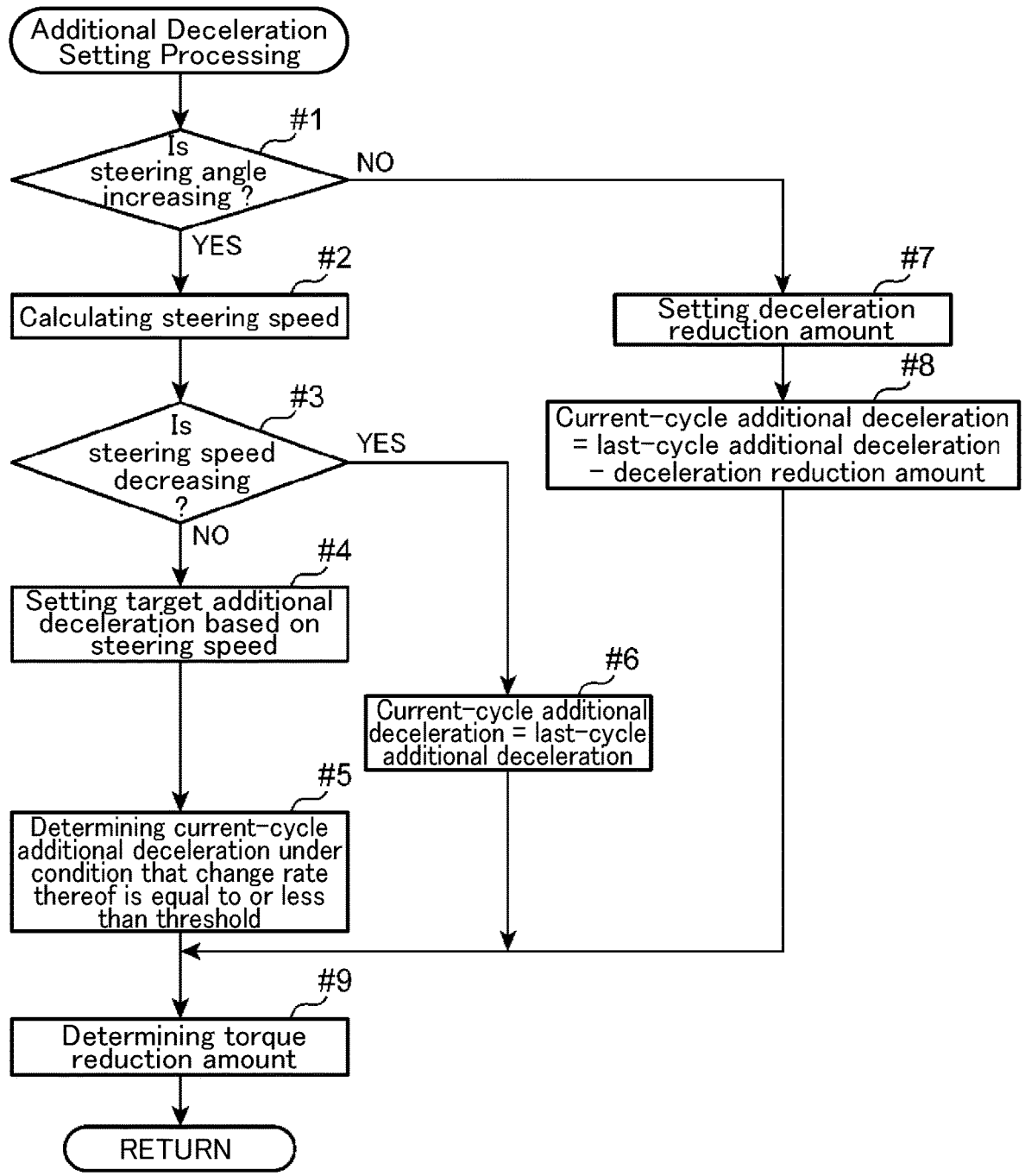
FIG. 8 is a flowchart showing a specific example of the vehicle attitude control.

With reference to a flowchart illustrated in FIG. 8, a specific example of the vehicle attitude control will be described. In FIG. 8, considering the meaning of adding a deceleration by means of torque reduction with respect to the target basic engine torque, the vehicle attitude control is referred to as "additional deceleration setting processing". Upon start of an additional deceleration setting processing routine, the vehicle attitude control part 62 operates to determine whether or not the absolute value of the steering angle acquired from a result of the detection by the steering angle sensor SN11 is increasing (step #1). When the absolute value of the steering angle is determined to be increasing (YES in the step #1), the vehicle attitude control part 62 operates to calculate the steering speed from the acquired steering angle (step #2).

Subsequently, the vehicle attitude control part 62 operates to determine whether or not the absolute value of the steering speed calculated in the step #2 is decreasing (step #3). When the absolute value of the steering speed is determined not to be decreasing (NO in the step #3), i.e., the absolute value of the steering speed is determined to be increasing or the absolute value of the steering speed is determined not to be changing, the vehicle attitude control part 62 operates to set a target additional deceleration based on the steering speed (step #4). This target additional deceleration is a deceleration to be added to the vehicle 100 according to manipulation of the steering wheel 105 intended by a driver.

Figure 9:
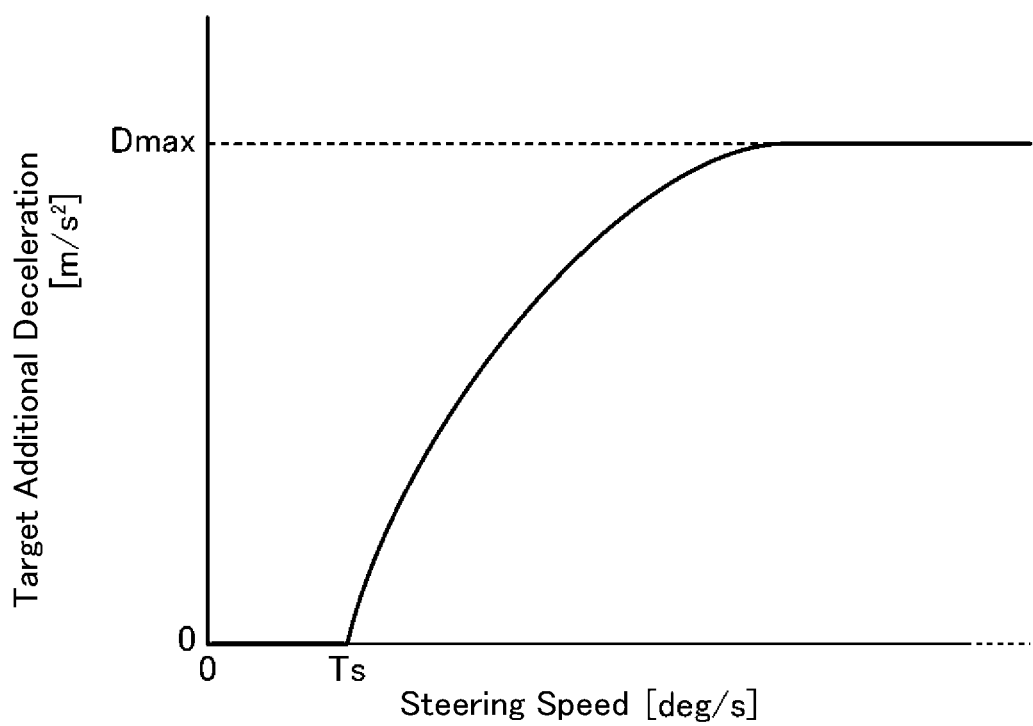
FIG. 9 is a graph showing a relationship between a steering speed and a target additional deceleration.

Specifically, the vehicle attitude control part 62 operates to acquire a value of the target additional deceleration corresponding to the steering speed calculated in the step #2, based on a relationship between the target additional deceleration and the steering speed, represented by the map of FIG. 9. Referring to FIG. 9, when the steering speed is equal to or less than a given threshold $T_S$, a corresponding value of the target additional deceleration is 0. That is, when the steering speed is equal to or less than the threshold $T_S$, the vehicle attitude control part 62 operates to avoid executing the control of reducing the engine output torque so as to add a deceleration to the vehicle 100 (vehicle attitude control), even if the steering wheel 105 is manually turned. On the other hand, when the steering speed is greater than the threshold $T_S$, a value of the target additional deceleration corresponding to this steering speed comes closer to a given upper limit $D_{max}$ (e.g., 1 m/s$^2$). That is, as the steering speed becomes larger, the target additional deceleration becomes larger, and the increase rate of the target additional deceleration becomes smaller.

Subsequently, the vehicle attitude control part 62 operates to determine a maximum increase rate $R_{max}$ which is a threshold of an additional deceleration to be used when the deceleration is added to the vehicle 100. Then, the vehicle attitude control part 62 operates to determine an additional deceleration in a current processing cycle (current-cycle additional deceleration), under the condition that the increase rate of the current-cycle additional deceleration is equal to or less than the maximum increase rate $R_{max}$ (step #5).

Specifically, when an increase rate from the additional deceleration determined in the last processing cycle (last-cycle additional deceleration) to the target additional deceleration set in the step #4 in the current processing cycle is equal to or less than the maximum increase rate $R_{max}$, the vehicle attitude control part 62 operates to determine the target additional deceleration set in the step #4, as the current-cycle additional deceleration. On the other hand, when the increase rate from the last-cycle additional deceleration to the target additional deceleration set in the step #4 in the current processing cycle is greater than the $R_{max}$, the vehicle attitude control part 62 operates to determine, as the current-cycle additional deceleration, a value obtained by increasing the last-cycle additional deceleration at the maximum increase rate $R_{max}$.

Referring to the step #3 again, when the absolute value of the steering speed is determined to be decreasing (YES in the step #3), the vehicle attitude control part 62 operates to determine the last-cycle additional deceleration as the current-cycle additional deceleration (step #6). That is, when the absolute value of the steering speed is decreasing, an additional deceleration corresponding to a maximum value of the steering speed (i.e., a maximum value of the additional deceleration) is maintained.

Referring to the step #1 again, when the absolute value of the steering angle is determined not to be increasing (NO in the step #1), the vehicle attitude control part 62 operates to set an amount (deceleration reduction amount) by which the last-cycle additional deceleration is to be reduced in the current processing cycle (step #7). This deceleration reduction amount is calculated based on a constant reduction rate (e.g., 0.3 m/s$^3$) preliminarily stored in a memory or the like comprised in the ECU 60. Alternatively, the deceleration reduction amount may be calculated based on a reduction rate determined according to a driving state of the vehicle 100 obtained from various sensors or the steering speed calculated in step #2. Then, the vehicle attitude control part 62 operates to determine the current-cycle additional deceleration by subtracting the deceleration reduction amount set in the step #7 from the last-cycle additional deceleration (step #8).

Subsequently, the vehicle attitude control part 62 operates to determine a torque reduction amount, based on the current-cycle additional deceleration determined in the step #5, #6 or #8 (step #9: reduction torque setting step). Specifically, the vehicle attitude control part 62 operates to determine a value of the torque reduction amount required for realizing the current-cycle additional deceleration, based on current values of vehicle speed, road grade, a currently set one of a plurality of gear stages of a transmission, and others. Then, the vehicle attitude control part 62 operates to execute the retardation control of retarding the ignition timing of the spark plug 16 or the fuel amount reduction control of reducing the amount of fuel to be supplied into each cylinder 2, through the combustion control part 61, so as to reduce the engine output torque by an amount corresponding to the determined torque reduction amount.

[Control of Switching Among Plural Torque Reduction Means]

As mentioned above, in the engine system according to this embodiment, when the amount of change per unit time in the steering angle becomes equal to or greater than a preliminarily set reference value (hereinafter referred to as "satisfaction of a first condition"), the vehicle attitude control of reducing the output torque of the engine 1 is executed by the retardation control of retarding a drive timing of the spark plug 16, or the fuel amount reduction control of reducing the amount of fuel to be supplied into each cylinder 2. On the other hand, in the engine system according to this embodiment, as the type of combustion of an air-fuel mixture in the combustion chamber 6, not only the SI combustion (first combustion mode) but also the SPCCI combustion (second combustion mode) are performed. Specifically, when a required torque determined by the accelerator position and the vehicle speed falls into the second range A2 or the third range A3 illustrated in FIG. 4 (hereinafter referred to as "satisfaction of a second condition"), the SPCCI combustion in which an air-fuel mixture is self-ignited at a given timing is performed. Either one of the SI combustion and the SPCCI combustion is selected according to the operating state of the engine (combustion mode setting step).

The vehicle attitude control part 62 operates to, when determining satisfaction of the first condition, execute the vehicle attitude control (see FIG. 8). The vehicle attitude control part 62 also operates to, when determining satisfaction of the second condition, control the fuel injection timing of the injector 15 and the drive (ignition) timing of the ignition plug 16 so as to develop the SPCCI combustion (see FIG. 5). Further, in the SPCCI combustion, a mode switching will be performed between the first air/fuel ratio mode ($\lambda$>1) in which an air-fuel mixture is formed to have an air/fuel ratio leaner than the stoichiometric air/fuel ratio, and the second air/fuel ratio mode ($\lambda$≤1) in which the air-fuel mixture is formed to have an air/fuel ratio equal to or richer than the stoichiometric air/fuel ratio (see the charts (b), (c) of FIG. 5).

Thus, when the first condition and the second condition are simultaneously satisfied, the vehicle attitude control and the SPCCI control will be overlappingly executed. That is, in a state in which the SPCCI combustion is performed, the reduction of the engine out put can be performed to execute the vehicle attitude control. The retardation of the ignition timing of the spark plug 16 (ignition retardation) is the simplest as means for the torque reduction. However, if, in the state in which the SPCCI combustion is performed, the ignition retardation is performed to execute the vehicle attitude control, the combustion is likely to become unstable. Specifically, if the start timing of the SI combustion in the SPCCI combustion is retarded due to the ignition retardation, the in-cylinder pressure of the combustion chamber 6 is likely not to rise to a value required for the CI combustion in the late phase of the SPCCI combustion. In this situation, combustion in the combustion chamber 6 is likely to come into a state in which it is unstable or there is a possibility of misfire (combustion unstable state).

In view of the above, in this embodiment, the determination part 63 operates to determine whether or not a current operating state of the engine is likely to lead to the combustion unstable state. Specifically, it is determined whether the first condition and the second condition are simultaneously satisfied. Then, when the current operating state is determined to be likely to lead to the combustion unstable state, the determination part 63 operates to execute, as engine output torque reduction means for execution of the vehicle attitude control, and, instead of the retardation control (torque reduction step) to be executed when the first condition is satisfied, retardation suppression control (suppression step) of suppressing the degree of the retardation control, thereby reducing the engine output torque. That is, during the SPCCI combustion, the vehicle attitude control is executed by means of suppressed ignition retardation, instead of the normal ignition retardation.

The retardation suppression control includes the following two modes:

(1) Prohibition of torque reduction by ignition retardation; and
(2) Limitation of the degree of ignition retardation.

In the mode (1), the torque reduction means (retardation control) for the vehicle attitude control is completely substituted by a different control (the fuel amount reduction control). In the mode (2), the ignition retardation undertakes a part of a required torque reduction, and the different control undertakes the remaining part of the torque reduction. Thus, in the mode (1), the timing of forced ignition to an air-fuel mixture by the ignition plug 16 is kept at a timing set for the SPCCI combustion. On the other hand, in the mode (2), the degree of ignition retardation is set to be less than that of ignition retardation to be set for the normal SI combustion. This makes it possible to easily develop given SPCCI combustion.

The above torque reduction means switching control by the determination part 63 will be described with reference to the flowcharts illustrated in FIGS. 10(A) and 10(B). FIG. 10(A) shows one example in which the engine output torque reduction means for execution of the vehicle attitude control is switched, depending on whether or not the SPCCI combustion is performed, i.e., the engine is operated in the second range A2 or the third range A3 in the operating range map of FIG. 4. In this example, the retardation suppression control is executed in the mode (1).

Upon start of an engine control processing routine, the ECU 60 (FIG. 3) operates to read various sensor signals regarding the driving state of the vehicle 100 (step #11). Specifically, the ECU 60 operates to acquire a variety of information including the vehicle speed obtained from a detection signal of the crank angle sensor SN1, the relative position of the accelerator pedal 107 detected by the accelerator position sensor SN10, the steering angle of the steering wheel 105 detected by the steering angle sensor SN11, and a currently set one of the gear stages of the transmission of the vehicle 100.

Subsequently, the determination part 63 operates to determine whether or not there is a request for the additional deceleration, i.e., there is a request for the torque reduction for execution of the vehicle attitude control (whether or not the first condition is satisfied) (step #12). When the incremental amount of the steering angle exceeds a reference incremental amount, the vehicle attitude control part 62 operates to issue a request for the additional deceleration (YES in the step #12). In this case, the determination part 63 operates to determine whether or not the SPCCI combustion is performed by the combustion control part 61 (whether or not the second condition is satisfied) (step #13). On the other hand, when there is no request for the additional deceleration (NO in the step #12), the determination part 63 operates to complete one cycle of the processing routine (return to the step #11).

When the SPCCI combustion is performed (YES in the step #13), the determination part 63 operates to cause the vehicle attitude control part 62 to prohibit the torque reduction by the retardation control (ignition retardation) of controlling the spark plug 16 to retard the ignition timing, and, instead, execute the fuel amount reduction control of reducing the fuel injection amount of the injector 15, so as to perform the torque reduction for the vehicle attitude control (step #14). That is, when the first condition and the second condition are satisfied, the determination part 63 operates to execute the retardation suppression control of suppressing at least the degree of the ignition timing retardation control (suppression step).

On the other hand, when the SPCCI combustion is not performed (NO in the step #13), i.e., when the engine is operated in the first range A1 or the fourth range A4 in the operating range map of FIG. 4, the determination part 63 operates to cause the vehicle attitude control part 62 to execute the retardation control of retarding the ignition timing at which an air-fuel mixture is ignited by the spark plug 16, so as to perform the torque reduction for the vehicle attitude control (step #15). That is, when the first condition is satisfied but the second condition is not satisfied, the determination part 63 operates to retard the drive timing of the spark plug 16 so as to reduce the output torque of the engine 1 (torque reduction step). Here, as a required torque reduction amount becomes larger, the degree of retardation of the ignition timing is set more largely. After execution of the steps #14 and #15, the determination part 63 operates to complete one cycle of the processing routine (return to the step #11).

As above, in the example illustrated in FIG. 10(A), the determination part 63 operates to, when determining satisfaction of the first condition and the second condition, reduce the engine output torque by, instead of the retardation control to be executed when the first condition is satisfied, the retardation suppression control of suppressing the degree of the retardation control (prohibition of the ignition retardation). That is, during the SPCCI combustion, the vehicle attitude control is executed by, under prohibition of the ignition retardation, different means for torque reduction, such as the fuel amount reduction control. Thus, in the retardation suppression control, the start timing of the SI combustion in the SPCCI combustion is not retarded, as compared to the normal retardation control. Therefore, the in-cylinder temperature and pressure are sufficiently raised by hear generated by the SI combustion, so that it is possible to adequately produce the CI combustion in the late phase of the SPCCI combustion, without causing misfire. On the other hand, when the SI combustion is performed, instead of the SPCCI combustion, the misfire problem does not substantially occur. In this case, the vehicle attitude control is executed by means of the ignition retardation, so that it is possible to simplify the control.

FIG. 10(B) shows another example in which the engine output torque reduction means for execution of the vehicle attitude control is switched, depending on whether or not the SPCCI combustion is performed, and, when YES, the SPCCI combustion is performed in the first air/fuel ratio mode ($\lambda$>1) using an air-fuel mixture with a lean air/fuel ratio, i.e., the engine is operated in the second range A2 in the operating range map of FIG. 4.

Processings in steps #21 and #22 are the same as those in the steps #11 and #12 of the above example, and therefore description thereof will be omitted. When the vehicle attitude control part 62 is operating to issue the request for the additional deceleration (YES in the step #22), the determination part 63 operates to determine whether or not the combustion control part 61 is operating to perform the SPCCI combustion in the first air/fuel ratio mode ($\lambda$>1) (whether or not the second condition is satisfied, and, when YES, the first air/fuel ratio mode is performed) (step #23).

When the SPCCI combustion in the first air/fuel ratio mode is performed (YES in the step #23), the determination part 63 operates to cause the vehicle attitude control part 62 to prohibit the torque reduction by the retardation control (ignition retardation), and execute the fuel amount reduction control of reducing the fuel injection amount of the injector 15, so as to perform the torque reduction for the vehicle attitude control (step #24). That is, when the first condition and the second condition are satisfied, and the first air/fuel ratio mode ($\lambda$>1) is performed, the determination part 63 operates to execute the retardation suppression control of prohibiting the ignition retardation (suppression step), as means to reducing the output torque of the engine 1.

On the other hand, when the SPCCI combustion in the first air/fuel ratio mode is not performed (NO in the step #23), i.e., when the engine is operated in the first range A1 or the fourth range A4 in the operating range map of FIG. 4, the determination part 63 operates to cause the vehicle attitude control part 62 to execute the retardation control of retarding the ignition timing at which an air-fuel mixture is ignited by the spark plug 16, so as to perform the torque reduction for the vehicle attitude control (step #25). That is, when the first condition is satisfied but the second condition is not satisfied, or when the first condition and the second condition are satisfied, and the second air/fuel ratio mode is performed, the determination part 63 operates to retard the drive timing of the spark plug 16 so as to reduce the output torque of the engine 1 (torque reduction step).

As above, in the example illustrated in FIG. 10(B), the determination part 63 operates to, when determining satisfaction of the first condition and the second condition, and further determining that the first air/fuel ratio mode ($\lambda$>1) is performed, reduce the engine output torque by, under prohibition of the ignition retardation, a different control, i.e., the fuel amount reduction control. That is, during the SPCCI combustion using an air-fuel mixture with a lean air/fuel ratio, the vehicle attitude control is executed by the fuel amount reduction control, instead of the ignition retardation. If the ignition retardation is performed during combustion in the first air/fuel ratio mode ($\lambda$>1), the lean air-fuel mixture causes difficulty in self-ignition, thereby increasing the probability of misfire. However, in this example, when the vehicle attitude control is executed in the situation where the SPCCI combustion in the first air/fuel ratio mode ($\lambda$>1) is performed, the fuel amount reduction control is executed, so that it is possible to effectively suppress misfire.

When the air-fuel mixture is lean, the possibility of misfire becomes higher, and, on the other hand, in the second air/fuel ratio mode in which the air-fuel mixture is formed to have an air/fuel ratio equal to or less than the stoichiometric air/fuel ratio, the possibility of misfire becomes relatively low even if the retardation control is executed. In this example, when the vehicle attitude control is executed in the situation where the SPCCI combustion in the second air/fuel ratio mode is performed, the torque reduction by the ignition retardation is employed. Thus, he vehicle attitude control can be executed by control of the drive timing (ignition timing) of the ignition plug 16, which is relatively simple control.

[Specific Example of Engine Control Method]

Figure 11:
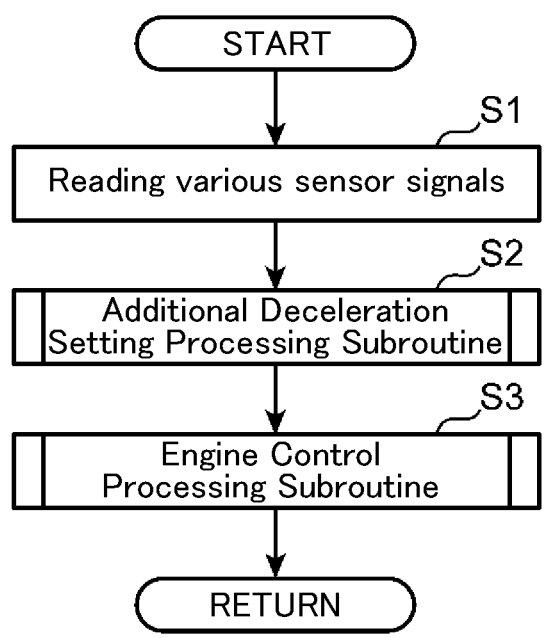
FIG. 11 is a flowchart showing a basic operation of an engine control method according to this embodiment.

Next, a specific example of operation control using the engine control method according to this embodiment will be described. FIG. 11 is a flowchart showing a basic operation of the engine control method according to this embodiment. Upon start of a processing routine, the ECU 60 (FIG. 3) operates to read sensor signals regarding the driving state of the vehicle 100 output from the sensors SN1 to SN13 (step S1). Then, the ECU 60 (the vehicle attitude control part 62) operates to refer to the vehicle speed (crank angle sensor SN1), the accelerator position (accelerator position sensor SN10), the steering angle (steering angle sensor SN11), a currently set one of the gear stages of the transmission of the vehicle 100, etc., which are obtained from the sensor signals read in the step S1, to execute processing of setting the additional deceleration (torque reduction amount) for the vehicle attitude control (step S2: decremental torque setting step). A specific example of this additional deceleration setting processing subroutine is as previously described based on the flowchart of FIG. 8. Then, the ECU 60 operates to execute an engine control processing subroutine, while taking into account the additional deceleration set in the step S2 (step S3). With reference to flowcharts illustrated in FIGS. 12 to 15, the engine control processing subroutine in the step S3 will be described in detail.

<Setting of Combustion Process Control Target Values>

Figure 12:
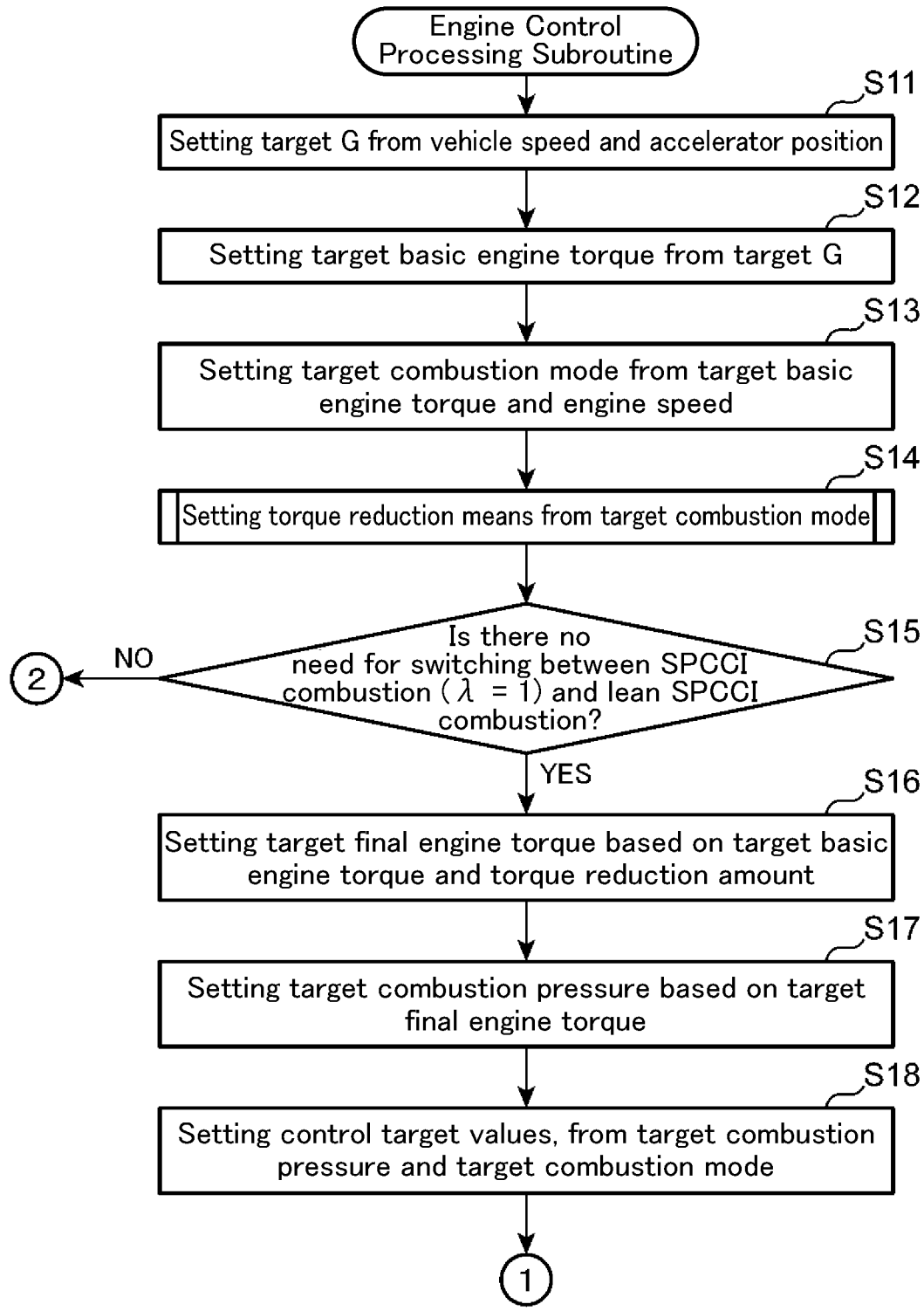
FIG. 12 is a flowchart showing the details of an engine control processing subroutine in the engine control method according to this embodiment.

FIG. 12 is a flowchart showing the details of the engine control processing subroutine, and mainly showing steps for setting combustion control target values. Upon start of the control processing subroutine, the ECU 60 (combustion control part 61) operates to refer to the vehicle speed, the accelerator position, the current gear stage, etc., acquired in the step S1 illustrated in FIG. 11, to set a target acceleration (target G) of the vehicle 100 (step S11). Then, the ECU 60 operates to set a target basic engine torque necessary to realize the set target acceleration (step S12). This target basic engine torque is a required torque calculated based on the amount of depression of the accelerator pedal 107 by the driver (accelerator position), i.e., a required torque before taking into account the torque reduction for the vehicle attitude control.

Subsequently, the ECU 60 operates to set a target combustion mode, from the target basic engine torque, and a current value of the engine speed detected by the crank angle sensor SN1 (step S13: combustion mode setting step). This target combustion mode is set by referring to, e.g., the operating range map illustrated in FIG. 4, preliminarily defined by the relationship between the engine speed and the engine load. Specifically, the ECU 60 operates to determine to which of the first to fourth ranges A1 to A4 in the operating range map the current value of the engine speed and the target basic engine torque (engine load) set in the step S12 belong, and set, as the target combustion mode, a corresponding one of the combustion modes illustrated in the charts (a) to (e).

Subsequently, the ECU 60 (determination part 63) operates to set means to attain the torque reduction for the vehicle attitude control, according to the target combustion mode set in the step S13 (step S14). As mentioned above, in this embodiment, as the torque reduction means, one of the reduction of the fuel injection amount to be injected from the injector 15, and the ignition retardation, i.e., retardation of the drive timing of the spark plug 16, is employed. An example of control of selecting one of the two means is as previously exemplified in the flowcharts of FIGS. 10(A) and 10(B). For example, when the example illustrated in FIG. 10(B) is employed, a relationship between the target combustion mode and the torque reduction means is as shown in the following Table 1.

TABLE 1

| Target Combustion Mode | Torque Reduction Means |
|---|---|
| SPCCI_$\lambda$ > 1 (First air/fuel ratio mode) | Reduction of fuel injection amount |
| SPCCI_$\lambda$ = 1 (Second air/fuel ratio mode) | Ignition retardation |
| SI_$\lambda$ = 1 | Ignition retardation |

Subsequently, the ECU 60 (determination part 63) operates to determine whether or not there is a need for switching the SPCCI combustion between the first air/fuel ratio mode ($\lambda$>1) and the second air/fuel ratio mode ($\lambda$=1) (step S15). Here, the determination about the switching the SPCCI combustion between the first air/fuel ratio mode ($\lambda$>1) and the second air/fuel ratio mode ($\lambda$=1) is performed based on the target basic engine torque set in the step S12, before the torque reduction amount for the vehicle attitude control is subtracted therefrom.

The intervention of the determination step S15 is for the following reason. When the SPCCI combustion is performed in the first air/fuel ratio mode, the air/fuel ratio A/F is set to a lean A/F of about 25/1 to 30/1, and, when the SPCCI combustion is performed in the second air/fuel ratio mode, the air/fuel ratio A/F is set to be 14.7/1 ($\lambda$=1). During the process of performing the mode switching between the first air/fuel ratio mode and the second air/fuel ratio mode, the engine comes into an unstable state in which the amount of intake air, the fuel injection amount or the like to be supplied to each cylinder changes to allow the air/fuel ratio to make a transition to a value conforming to each air/fuel ratio mode. In this state, if the torque reduction for the vehicle attitude control is overlappingly performed, a problem that combustion becomes unstable or misfire occurs is likely to arise. In view of this, the determination section 63 operates to perform the torque down for the vehicle attitude control when there is no need for the mode switching (YES in the step S15), and to prohibit the torque down for the vehicle attitude control when there is a need for the mode switching (NO in the step S15). In the latter case, iso-torque mode switching control of performing the mode switching without torque fluctuation (the after-mentioned control in FIG. 14 or 15) is executed.

When there is no need for the mode switching (YES in the step S15), the ECU 60 (combustion control part 61) operates to set a target final engine torque, from the target basic engine torque set in the step S12 and the torque reduction amount set in the step S2 illustrated in FIG. 11 (step #9 illustrated in FIG. 8) (step S16). This target final engine torque is a torque obtained by subtracting the torque reduction amount for the vehicle attitude control, from the required torque. Here, it is obvious that, when there is no request for execution of the vehicle attitude control, the torque reduction amount to be subtracted is zero. Then, the ECU 60 operates to set a target combustion pressure inside the combustion chamber 6, based on the target final engine torque (step S17).

Subsequently, the ECU 60 operates to set combustion process control target values, from the target combustion pressure set in the step S17 and the target combustion mode set in the step S13 (step S18). Specifically, a target air amount to be supplied to the combustion chamber 6, a target self-ignition timing for developing the CI combustion, a target SI rate, a target air/fuel ratio, a target ignition timing at which an air-fuel mixture is ignited by the spark plug 16, etc., are set as the control target values.

Here, the term "SI rate" means a rate of the heat release amount of the SI combustion to the entire heat release amount, in the SPCCI combustion. Referring to FIG. 6, inflection point X therein is a time point when the combustion type is switched from the SI combustion to the CI combustion. An area R1 of a part of the heat release rate waveform located on the advance side with respect to a crank angle $\theta$ci corresponding to the inflection point X is defined as the heat release amount of the SI combustion, and an area R2 of the remaining part of the heat release rate waveform located on the retard side with respect to the $\theta$ci is defined as the heat release amount of the CI combustion. The SI rate can be expressed using the areas R1, R2, as follows: SI rate=R1/(R1+R2).

Figure 16:
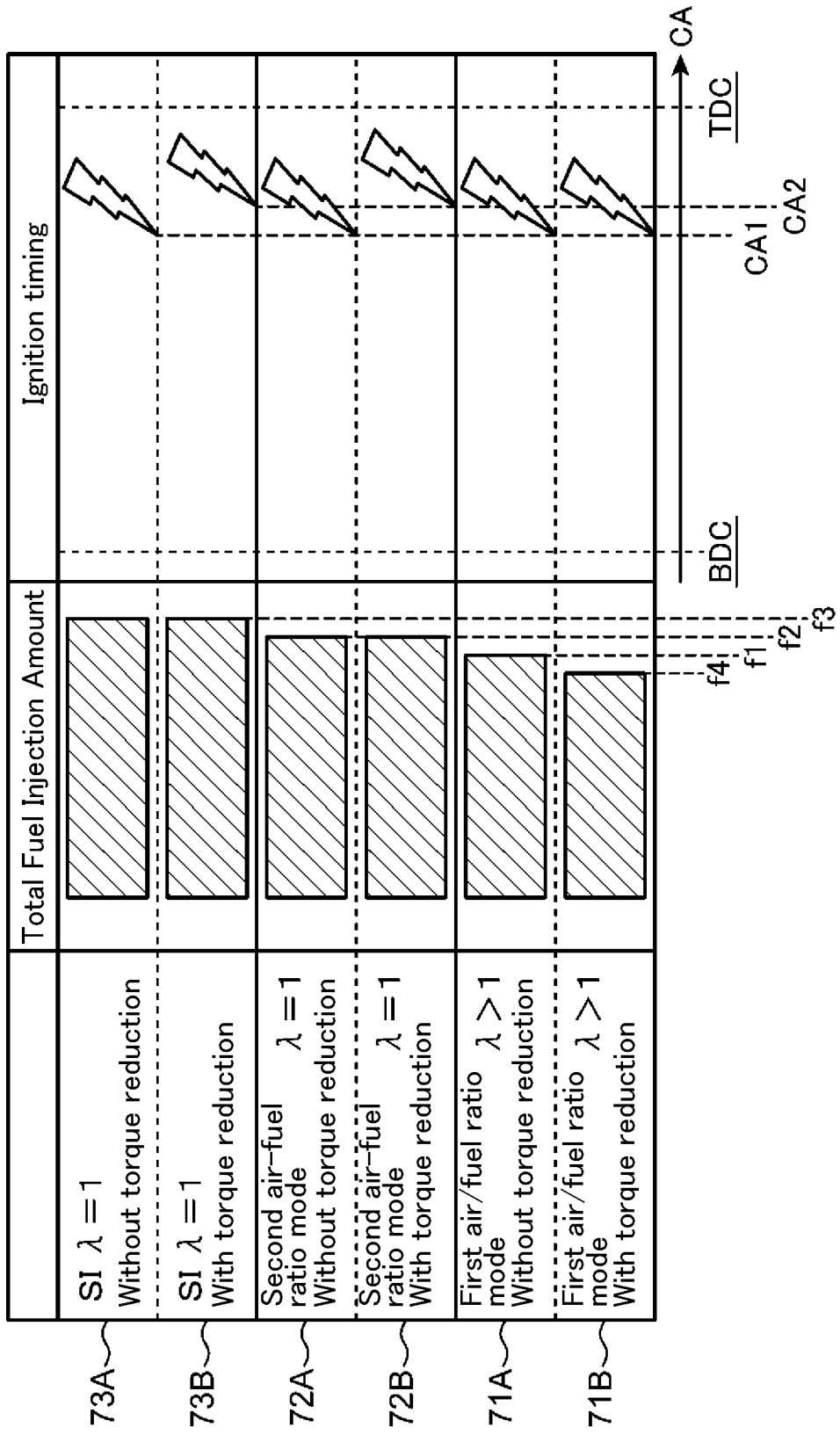
FIG. 16 is a tabular diagram showing a relationship between a total fuel injection amount and an ignition timing, in each of various operating modes.

FIG. 16 is a tabular diagram showing a relationship between the total fuel injection amount and the ignition timing in each of various target combustion modes, in a case where the example illustrated in FIG. 10(B) is employed in the setting of the torque reduction means in the step S14. In the first air/fuel ratio mode 71A ($\lambda$>1) of the SPCCI combustion, the second air/fuel ratio mode 72A ($\lambda$=1) of the SPCCI combustion, and the SI combustion 73A, under the condition of "without torque reduction" for the vehicle attitude control, the total fuel injection amount is set to given values f1, f2, f3, respectively, and the ignition time is set to a given crank angle CA1.

On the other hand, in the first air/fuel ratio mode 71B ($\lambda$>1) of the SPCCI combustion under the condition of "with torque reduction" for the vehicle attitude control, the total fuel injection amount is changed to a value f4 which is reduced by a given amount with respect to the value f1 in the first air/fuel ratio mode 71A under the condition of "without torque reduction". Further, the target ignition timing is maintained at the crank angle CA1, i.e., the ignition retardation is not performed (prohibition of the ignition retardation). Further, in the second air/fuel ratio mode 72B ($\lambda$=1) of the SPCCI combustion under the condition of "with torque reduction", the total fuel injection amount is maintained at the value f2, whereas the ignition retardation is performed such that the target ignition timing is retarded from the crank angle CA1 to a crank angle CA2. Similarly, in the SI combustion 73B under the condition of "with torque reduction", the total fuel injection amount is maintained at the value f3, whereas the ignition retardation is performed such that the target ignition timing is retarded from the crank angle CA1 to a crank angle CA2.

<Details of SPCCI Combustion Control>

Figure 13:
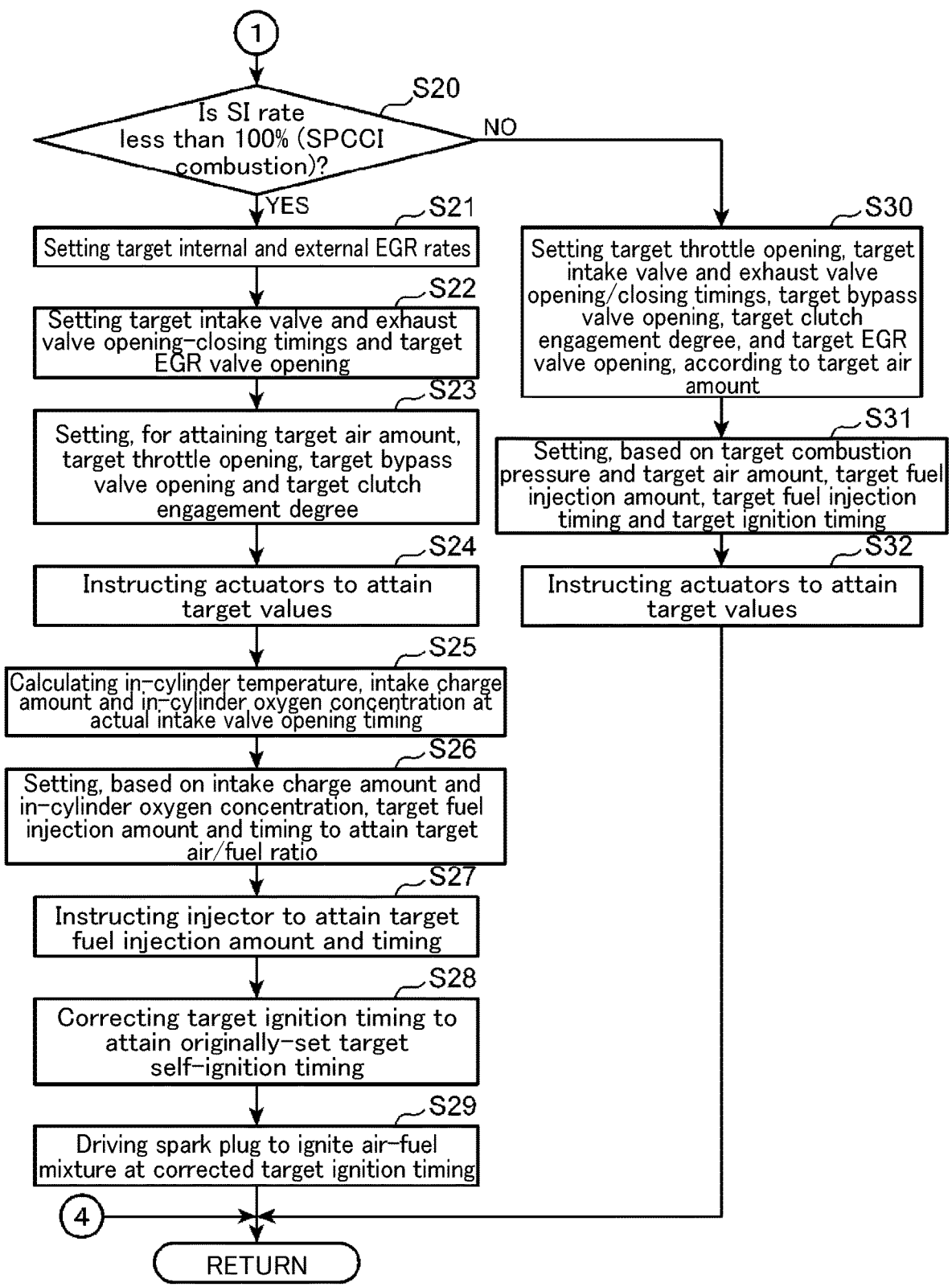
FIG. 13 is a flowchart showing the details of the engine control processing subroutine.

FIG. 13 is a flowchart showing the details of the engine control processing subroutine, and mainly showing steps relating to detailed control of the SPCCI combustion. Following the step S18 in FIG. 12, the ECU 60 operates to determine whether or not the SI rate is less than 100%, i.e., whether or not the target combustion mode is the SPCCI combustion (SI rate=100% means the SI combustion) (step S20).

When the target combustion mode is determined to be the SPCCI combustion (second combustion mode) (YES in the step S20), processing of setting control values of actuators other than the injector 15 and the spark plug 16 is first performed (steps S21 to S24). Specifically, the ECU 60 (combustion control part 61) operates to set a target EGR rate, from the target air amount set in the step S18, and the in-cylinder temperature assumed at the target self-ignition timing (step S21). In this embodiment, EGR comprises internal EGR to be performed by control of opening and closing timings of the intake valve 11 and the exhaust valve 12 (see FIG. 2) (early opening of the intake valve 11 or late closing of the exhaust valve 12), and external EGR configured to recirculate exhaust gas to the intake passage via an EGR passage 51. Thus, in the step S21, a target internal EGR rate and a target external EGR rate are set.

Then, a target intake valve opening/closing timing and a target exhaust valve opening/closing timing each of which is an opening/closing timing of a respective one of the intake valve 11 and the exhaust valve 12 for attaining the target internal EGR rate, and a target EGR valve opening which is the opening of the EGR valve 53 for attaining the target external EGR rate are set (step S22).

Subsequently, the ECU 60 operates to set, for attaining the target air amount, a target throttle opening which is the opening of the throttle valve 32, a target bypass valve opening which is the opening of the bypass valve 39 of the bypass passage 38, and a target clutch engagement degree which is the degree of engagement of the electromagnetic clutch 34 of the supercharger 33 (step S23). Then, the ECU 60 operates to transmit operation instructions, respectively, to actuators of control targets so as to achieve the target throttle opening, the target intake valve opening/closing timing, the target exhaust valve opening/closing timing, the target bypass valve opening, the target EGR valve opening and the target clutch engagement degree (step S24). That is, the actuators are operated according to the target values for achieving the SPCCI combustion, set in the step S18.

Subsequently, according to actual responsiveness of combustion with respect to each of the target values, processing of correcting the fuel injection amount and the fuel injection timing of the injector 15 and the ignition timing of the spark plug 16 is performed (steps S25 to S29). A valve or the like configured to be driven by an actuator is a device having relatively poor responsiveness, i.e., it is not immediately moved just as the target value. An operation delay of such a device exerts an influence on, e.g., attainment of the target air/fuel ratio. The ECU 60 operates to figure out the degree of divergence of an actual combustion state with respect to a target combustion state, due to the operation delay, and correct the fuel injection amount and the fuel injection timing of injector 15 having excellent responsiveness and the ignition timing of the spark plug 16 having excellent responsiveness, according to the state of internal gas actually formed in the combustion chamber 6, so as to correct the divergence.

Specifically, the ECU 60 operates to calculate the in-cylinder temperature, an intake charge amount and an in-cylinder oxygen concentration in each cylinder 2 at an actual intake valve closing timing (step S25). This calculation is performed by referring to: a detection value of the air flow sensor SN4; the state quantity of actual intake gas obtained from the first and second intake temperature sensors SN5, SN7, the external EGR rate, etc.; the state quantity of actual internal gas in each cylinder 2 obtained from detection values of the intake cam angle sensor SN12 and the exhaust cam angle sensor SN13, etc., and a combustion result in the last combustion cycle. As the combustion result in the last combustion cycle, it is possible to use the self-ignition timing obtained from the waveform of an actual in-cylinder pressure derived from a detection value of the in-cylinder pressure sensor SN3.

Subsequently, the ECU 60 operates to set, based on the intake charge amount and the in-cylinder oxygen concentration calculated in the step S25, a target fuel injection amount and a target fuel injection timing to attain the target air/fuel ratio set in the step S18 (step S26). As exemplified in the charts (a) and (b) of FIG. 5, in the first air/fuel ratio mode ($\lambda>1$) and the second air/fuel ratio mode ($\lambda=1$) of the SPCCI combustion, the fuel injection is performed in a manner divided into two stages. Thus, the ECU 60 operates to determine the fuel injection amount and fuel injection timing for each of the 1st and 2nd fuel injections. Then, the ECU 60 operates to transmit an instruction to the injector 15 to attain the target fuel injection amount and the target fuel injection timing (step S27).

Subsequently, the ECU 60 operates to correct the target ignition timing of the spark plug 16, based on the in-cylinder temperature of each cylinder 2 at the actual intake valve closing timing (step S28). Specifically, the target ignition timing set in the step S18 is corrected in a manner allowing the CI combustion to be started at the target self-ignition timing set in the step S18. Then, the ECU 60 operates to drive the spark plug 16 to ignite an air-fuel mixture at the corrected target ignition timing (step S29).

Referring to the step S20 again, when the SI rate is determined not to be less than 100%, i.e., the target combustion mode is determined to be the SI combustion (first combustion) (NO in the step S20), the ECU 60 operates to set the target throttle opening, the target intake valve opening/closing timing, the target exhaust valve opening/closing timing, the target bypass valve opening, the target clutch engagement degree, the target EGR valve opening, etc., according to the target air amount set in the step S18 (step S30). Subsequently, the ECU 60 operates to set, based on the target air amount and the target combustion pressure set in the step S18, a target fuel injection amount and a target fuel injection timing of the injector 15, and a corrected target ignition timing of the spark plug 16 (step S31). Then, the ECU 60 operates to drive the actuators, the injector 15 and the spark plug 16 to achieve the aforementioned target values (step S32).

<Mode Switching Control Switching from $\lambda=1$ to Lean A/F>

Figure 14:
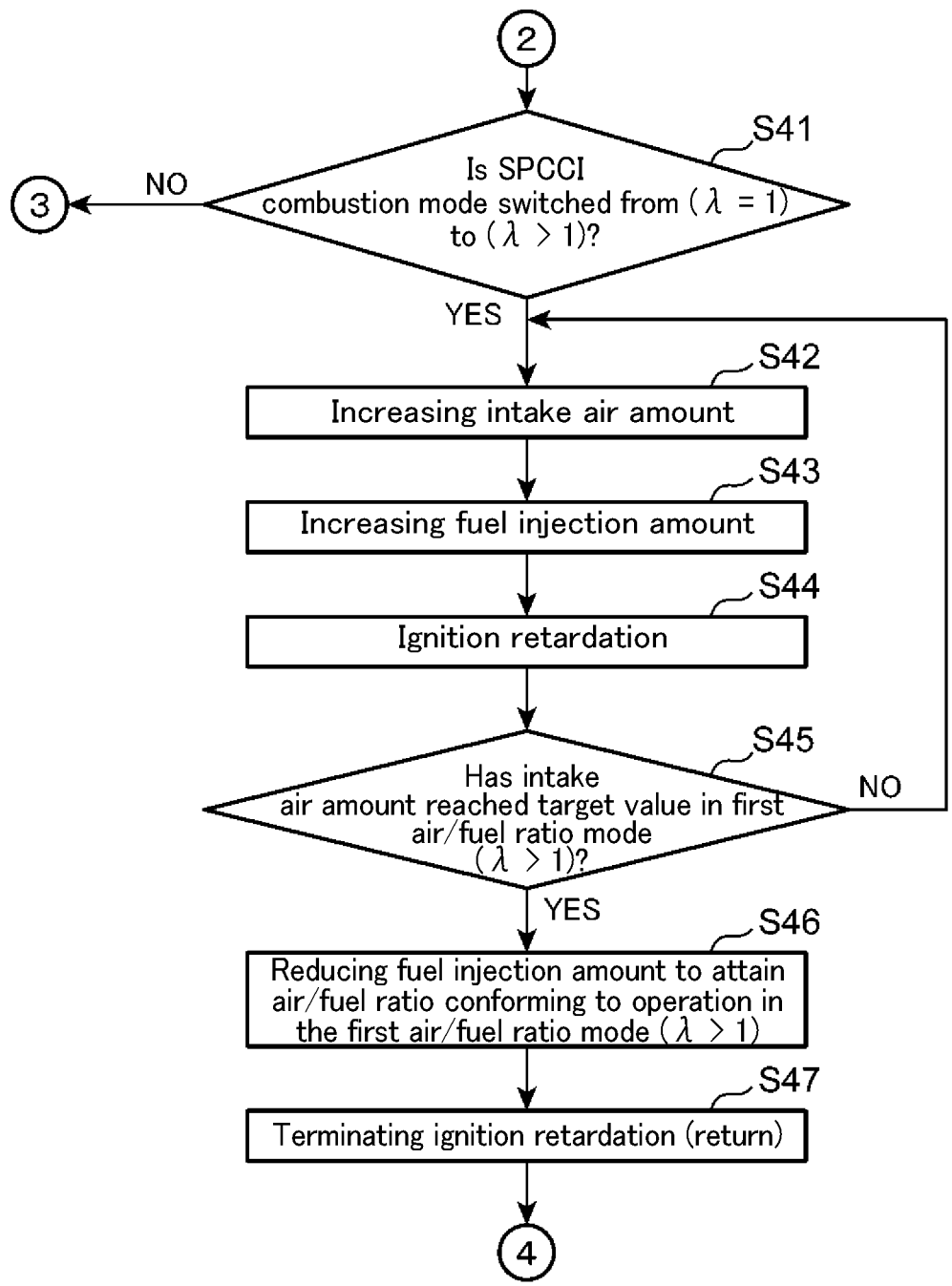
FIG. 14 is a flowchart showing the details of the engine control processing subroutine.
Figure 17:
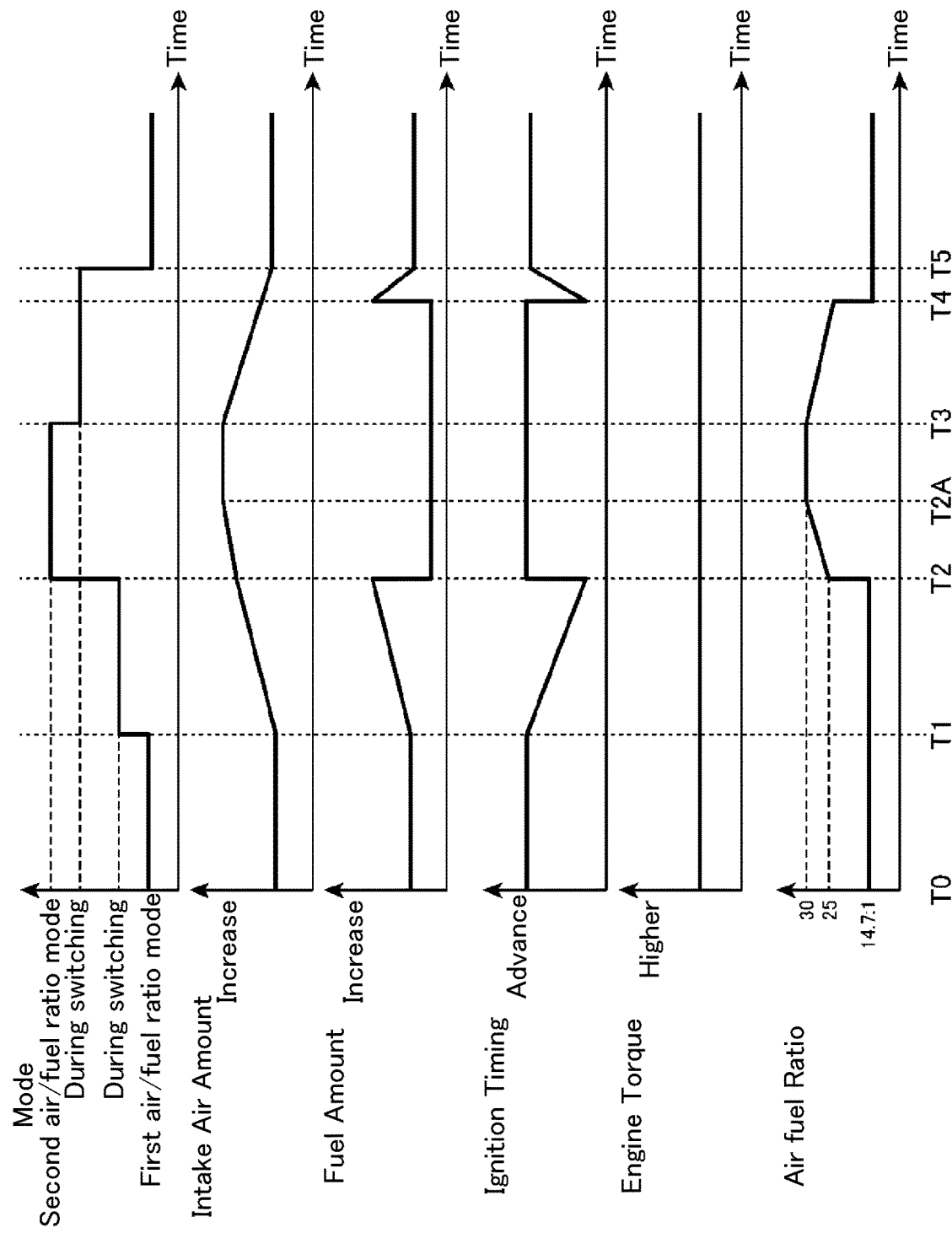
FIG. 17 illustrates time charts showing the state of mode switching between a first air/fuel ratio mode (λ>1) and a second air/fuel ratio mode (λ=1).

Next, the iso-torque mode switching control (air/fuel ratio mode setting step) to be executed when there is the need for switching the SPCCI combustion between the first air/fuel ratio mode ($\lambda>1$) and the second air/fuel ratio mode ($\lambda=1$), in the step S15, will be described. FIG. 14 is a flowchart showing mode switching control in the case where there is the need for switching from the second air/fuel ratio mode to the first air/fuel ratio mode, and FIG. 17 illustrates time charts showing relationships between the mode switching and respective ones of intake air amount, fuel amount, ignition timing and air/fuel ratio.

When there is the need for the mode switching in the step S15 illustrated in FIG. 12 (NO in the step S15), the processing subroutine transitions to step S41 illustrated in FIG. 14. The ECU 60 (determination part 63) operates to determine whether or not the mode switching is switching from the second air/fuel ratio mode to the first air/fuel ratio mode, i.e., switching of the SPCCI combustion from $\lambda=1$ to lean A/F (step S41). When the mode switching is determined to be switching from the second air/fuel ratio mode to the first air/fuel ratio mode (YES in the step S41), the determination part 63 operates to instruct the combustion control part 61 to execute control of changing the air/fuel ratio A/F from $\lambda=1$ to lean A/F, while maintaining the engine output torque constant during the mode switching.

Specifically, the ECU 60 (combustion control part 61) operates to increase the intake air amount by adjusting the opening of the throttle valve 32 (step S42), and increase the fuel injection amount of the injector 15 (step S43). Referring to FIG. 17, a time period from time T0 to time T1 is an execution period of the second air/fuel ratio mode, and a time period from the time T1 to time T2 is a mode switching period from the second air/fuel ratio mode to the first air/fuel ratio mode. The ECU 60 operates to cause the intake air amount and the fuel amount in the time period from the time T0 to the time T1 to be proportionally increased in the time period between the time T1 and the time T2, as shown in the charts. Specifically, while the intake air amount is gradually increased to change the air/fuel ratio toward a lean side, the fuel amount is also gradually increased. This is intended to avoid a situation where an air-fuel mixture is formed to have an air/fuel ratio causing production of NOx.

In parallel with the above, the ECU 60 operates to retard the ignition timing of the spark plug 16 in the time period between the time T1 and the time T2 (step S44). This is intended to suppress a situation where the engine output torque is fluctuated toward an increase side, due to an increase in the fuel amount in the time period between the time T1 and the time T2. The retardation of the ignition timing is performed such that, along with a gradual increase in the fuel amount, the ignition timing is gradually shifted to a retard side. As a result of the ignition retardation, the engine output torque is reduced, so that it is possible to cancel out an incremental torque corresponding to the increase in the fuel amount, thereby maintaining the engine output torque constant in the time period between the time T1 and the time T2.

The ECU 60 operates to ascertain whether or not the intake air amount has reached a target value of the intake air amount set for the first air/fuel ratio mode ($\lambda>1$) (step S45). This target value of the intake air amount is a value of the intake air amount capable of attaining an air/fuel ratio which is substantially free from producing NOx. In this embodiment, an air/fuel ratio A/F of 25/1 is a rich limit of the first air/fuel ratio (lean combustion) mode free from producing NOx, and an air/fuel ratio A/F of 30/1 is a given air/fuel ratio in the first air/fuel ratio. Thus, in the step S45, it is determined whether the air/fuel ratio has reached 25. Then, when the air/fuel ratio is determined not to have reached 25 (NO in the step S45), the processings in the steps S42 to S44 will be repeated. That is, the intake air amount and the fuel amount are further increased, and the ignition timing is further retarded.

On the other hand, when the intake air amount is determined to have reached a value capable of attaining an air/fuel ratio of 25 (YES in the step S45), the ECU 60 operates to rapidly drop the fuel amount to a value necessary for formation of a lean air-fuel mixture for the first air/fuel ratio mode (step S46). The time T2 in the time charts of FIG. 17 corresponds to the time point of the rapid dropping. As a result, an air-fuel mixture with an air/fuel ratio free from producing NOx in the first air/fuel ratio mode ($\lambda>1$) is formed in the combustion chamber 6. At this time point, the torque-down operation becomes unnecessary. Thus, the ECU 60 operates to terminate the ignition retardation (step S47). The intake air amount is successively increased even after the time T2. That is, the intake air amount is increased until time T2A when it reaches a value capable of attaining the given air/fuel ratio of 30.

<Mode Switching Control Switching from Lean A/F to $\lambda=1$>

Figure 15:
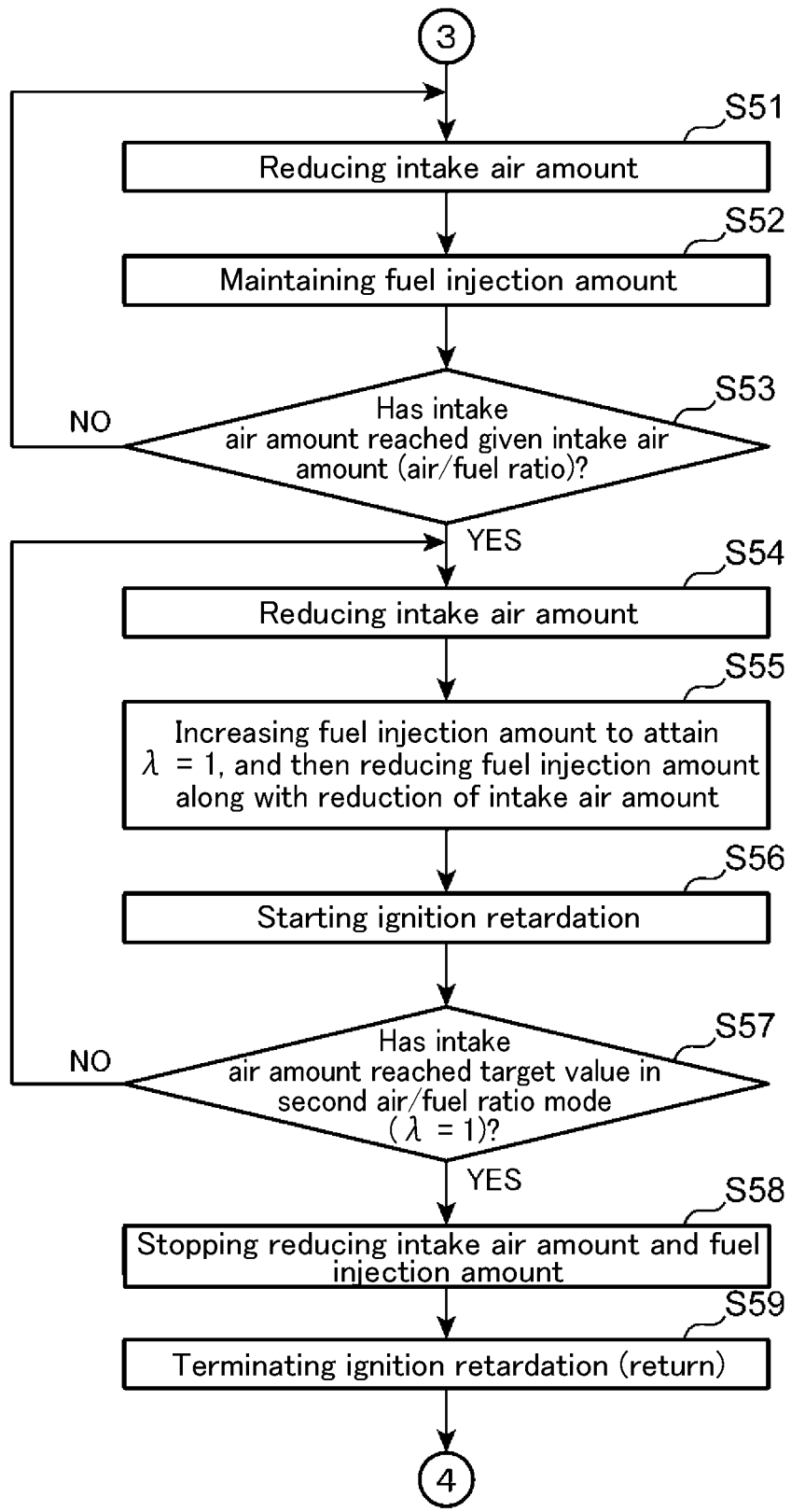
FIG. 15 is a flowchart showing the details of the engine control processing subroutine.

Next, with reference to FIGS. 15 and 17, the iso-torque mode switching control to be executed when there is the need for switching from the first air/fuel ratio mode ($\lambda>1$) to the second air/fuel ratio mode ($\lambda=1$) will be described. FIG. 15 is a flowchart showing mode switching control in the case where there is the need for switching from the first air/fuel ratio mode to the second air/fuel ratio mode, When the mode switching is not switching from the second air/fuel ratio mode to the first air/fuel ratio mode (NO in the step S41), the processing subroutine transitions to step S51 illustrated in FIG. 15. In this case, the determination part 63 of the ECU 60 operates to instruct the combustion control part 61 to execute control of changing the air/fuel ratio A/F from lean A/F to $\lambda=1$, while maintaining the engine output torque constant during the mode switching.

Specifically, the ECU 60 (combustion control part 61) operates to reduce the intake air amount by adjusting the opening of the throttle valve 32 (step S51). On the other hand, the fuel injection amount from the injector 15 is maintained (step S52). Referring to FIG. 17, a time period from the time T2 to time T3 is an execution period of the first air/fuel ratio mode, and a time period from the time T3 to time T5 is a mode switching period from the first air/fuel ratio mode to the second air/fuel ratio mode. The ECU 60 operates to cause the intake air amount in the time period from the time T2A to the time T3 attaining the first air/fuel ratio mode ($\lambda>1$) to be reduced in the time period between the time T3 and the time T4, as shown in the charts. On the other hand, the fuel injection amount in the time period between the time T3 and the time T4 is the same as that in the time period from the time T2A to the time T3.

Subsequently, the ECU 60 operates to ascertain whether or not the intake air amount has reached a given reduced intake air amount (air/fuel ratio) (step S53). This reduced intake air amount is a value of the intake air amount capable of attaining an air/fuel ratio A/F of 25/1 which a rich limit of the first air/fuel ratio (lean combustion) mode free from producing NOx. When the air/fuel ratio is ascertained not to have reached 25 (NO in the step S53), the processing subroutine returns to the step S51 in which the intake air amount is further reduced.

On the other hand, when the intake air amount is ascertained to have reached a value capable of attaining an air/fuel ratio of 25 (YES in the step S53) at time T4, control of preventing production of NOx is executed. Specifically, the ECU 60 operates to gradually reduce the intake air amount (step S54), and, at the time T4, rapidly increase the fuel injection amount of the injector 15 to form an air-fuel mixture with an air/fuel ratio of 14.7 ($\lambda=1$) based on a value of the intake air amount at the time T4 (step S55). In order to maintain $\lambda=1$, after the time T4, the fuel injection amount is also reduced along with the reduction in the intake air amount. This makes it possible to avoid a situation where an air-fuel mixture is formed to have an air/fuel ratio causing production of NOx. Further, the ECU 60 operates to, at the time T4, rapidly retard the ignition timing of the spark plug 16 according to the intake air amount and the fuel injection amount at the time T4, so as to cancel out an incremental torque corresponding to the increase in the fuel amount (step S56), as with the aforementioned step S44. This makes it possible to prevent torque fluctuation around the time T4.

The ECU 60 operates to ascertain whether or not the intake air amount has reached a target value of the intake air amount set for the second air/fuel ratio mode (λ=1) (step S57). That is, it is ascertained whether or not the intake air amount has been reduced to a value capable of performing the second air/fuel ratio mode, although the air/fuel ratio is reduced to 14.7 at the time T4. When the intake air amount is ascertained not to have been reduced to the value (NO in the step S57), the processings in the steps S54 to S56 will be repeated. That is, the intake air amount and the fuel amount are further increased, and the ignition timing is gradually recovered. This makes it possible to maintain the output torque constant in the time period from the time T4 to the time T5.

On the other hand, the intake air amount is ascertained to have reached the target value for the second air/fuel ratio mode (λ=1) (YES in the step S57), the ECU 60 operates to stop further reducing the intake air amount and the fuel injection amount (step S58). The time T5 in the time charts of FIG. 17 corresponds to the time point of the stopping. In this way, an air-fuel mixture with λ=1 satisfying the intake air amount for the second air/fuel ratio mode is formed in the combustion chamber 6. Then, the ECU 60 operates to terminate the ignition retardation at the time T5 (step S59). At a time point just before the time T5, the torque reduction by the ignition retardation is automatically minimized. After completion of the step S47 in FIG. 14 or the step S59 in FIG. 59, the processing subroutine transitions to "RETURN" in FIG. 13, i.e., returns to the step S11 in FIG. 12, and the same processings will be repeated.

[Modifications]

Although the present invention has been described based on one embodiment thereof, it is to be understood that the present invention is not limited to the embodiment. For example, the embodiment may be modified as follows.

(1) As an example of a vehicle, the above embodiment shows the vehicle 100 composed of a front-engine, front-wheel drive vehicle. However, the engine control method and the engine system of the present invention can also be applied to a front-engine, rear-wheel drive vehicle, a four-wheel-drive vehicle, and a hybrid vehicle using, as a driving source, a motor configured to be driven by electric power supplied from a battery or a capacitor, and an internal combustion engine.

(2) The above embodiment shows an example where the torque reduction for the vehicle attitude control is prohibited when there is the need for the mode switching between the first air/fuel ratio mode (λ>1) and the second air/fuel ratio mode (λ=1) (NO in the step S15 illustrated in FIG. 12). However, in a situation where combustion is less likely to become unstable because the air/fuel ratio of an air-fuel mixture formed in the first air/fuel ratio mode is close to λ=1, the determination in the step S15 may be omitted to allow the torque reduction for the vehicle attitude control to be always performed.

(3) Further, when there is the need for the mode switching, instead of prohibiting the torque reduction for the vehicle attitude control, the mode switching may be temporarily prohibited during execution of the vehicle attitude control.

(4) The above embodiment shows one example of the retardation suppression control configured such that, during the SPCCI combustion (example in FIG. 10(A)) or during the first air/fuel ratio mode of the SPCCI combustion (examples in FIG. 10(B) and FIGS. 12 to 15), means to attain the torque reduction for the vehicle attitude control is completely switched from the ignition retardation (retardation control) to the fuel amount reduction control. However, instead of prohibition of the ignition retardation, the retardation suppression control may be configured such that a part of the torque reduction for the vehicle attitude control is attained by the ignition retardation (control of limiting the degree of the ignition retardation), and the remaining part is attained by the fuel amount reduction control.

FIG. 18 is a tabular diagram showing one modification of retardation suppression control. In FIG. 18, a chart (a) shows the total fuel injection amount and the ignition timing in the SI combustion. In the SI combustion, the total fuel injection amount is an amount of f4, and the ignition timing is set at a crank angle CA21 under the condition of "without torque reduction", and set at a crank angle CA23 retarded with respect to the CA21, under the condition of "with torque reduction", A chart (b) shows the parameters in the SPCCI combustion, wherein a chart (b1) shows an example of "without torque reduction", and a chart (b2) shows an example of the retard suppression control in which the ignition retardation is prohibited under the condition of "with torque reduction". In the SPCCI combustion illustrated in the chart (b2), the total fuel injection amount is reduced from f13 to f11, as compared to the chart (b1). On the other hand, the ignition timing is the same as that in the chart (b1), i.e., the ignition retardation is not performed. The chart (b1) and the chart (b2) correspond, respectively, to the first air/fuel ratio mode 71A and the first air/fuel ratio mode 71B of the SPCCI combustion as previously described based on FIG. 16.

Further, a chart (b3) shows one modification of the retardation suppression control in the SPCCI combustion. Although the total fuel injection amount f12 for the SPCCI combustion in the chart (b3) is less than the f13 for the SPCCI combustion (W/O torque reduction) illustrated in the chart (b1), it is set to be greater than the f11 for the SPCCI combustion (W torque reduction/Prohibition of ignition retardation). Further, the crank angle of the ignition timing for the SPCCI combustion in the chart (b3) is set to CA22, which is retarded with respect to the ignition timing (CA21) for the SPCCI combustion in the charts (b1) and (b2), but advanced with respect to the ignition timing (CA23) for the SI combustion in the charts (a). According to this retardation suppression control, the degree of the ignition retardation is suppressed by a difference between the crank angles CA23 and CA22, so that it is possible to reduce the risk of misfire or the like. Further, the insufficiency of the ignition retardation is covered by the reduction (f13−f12) of the fuel injection amount, so that it is possible to achieve a required torque reduction for the vehicle attitude control.

(5) As another modification, the retardation suppression control may be configured such that a part of the torque reduction for the vehicle attitude control is attained by the ignition retardation (control of limiting the degree of the ignition retardation), without covering the remaining part by the fuel amount reduction control as in the section (4). That is, when the retardation suppression control is executed, the torque reduction needs not necessarily be complemented by other means.

LIST OF REFERENCE SIGNS

1: engine
2: cylinder

15: injector (fuel injector)
16: spark plug
60: ECU (controller)
61: combustion control part
62: vehicle attitude control part
63: determination part
100: vehicle
120: front road wheel (steerable road wheel/drive road wheel)
107: accelerator pedal
SN10: accelerator position sensor (operating state sensor)
SN11: steering angle sensor

The invention claimed is:

1. A control method for an engine which is mounted to a vehicle having steerable road wheels and mechanically coupled to drive road wheels of the vehicle, and which includes a spark plug, the control method comprising:
 a combustion mode setting step of selecting, a combustion mode of the engine between a first combustion mode in which an entirety of an air-fuel mixture in a cylinder of the engine is combusted by a propagation of a flame produced by the spark plug, and a second combustion mode in which at least a part of an air-fuel mixture in the cylinder is combusted by a self-ignition, on the basis of an operating state of the engine;
 a decremental torque setting step of setting a torque reduction amount by which an output torque of the engine is to be reduced, on the basis of a steering angle of the steerable road wheels;
 a torque reduction step of executing a retardation control for controlling the spark plug so as to retard an ignition timing based on the torque reduction amount set in the decremental torque setting step, when the first combustion mode is selected in the combustion mode setting step; and
 a suppression step of executing a retardation suppression control for suppressing a degree of the retardation control based on the torque reduction amount set in the decremental torque setting step, when the second combustion mode is selected in the combustion mode setting step.

2. The control method according to claim 1, further comprising an air/fuel ratio mode setting step of, when the second combustion mode is selected in the combustion mode setting step, selecting an air/fuel ratio mode between a first air/fuel ratio mode in which the air-fuel mixture is set to be leaner than a stoichiometric air/fuel ratio, and a second air/fuel ratio mode in which the air-fuel mixture is set to be equal to or richer than the stoichiometric air/fuel ratio, on the basis of the operating state of the engine,
 wherein the retardation suppression control in the suppression step is executed when the first air/fuel ratio mode is selected in the air/fuel ratio mode setting step.

3. The control method according to claim 1, further comprising an air/fuel ratio mode setting step of, when the second combustion mode is selected in the combustion mode setting step, selecting an air/fuel ratio mode between a first air/fuel ratio mode in which the air-fuel mixture is set to be leaner than a stoichiometric air/fuel ratio, and a second air/fuel ratio mode in which the air-fuel mixture is set to be equal to or richer than the stoichiometric air/fuel ratio, on the basis of the operating state of the engine,
 wherein the retardation control in the torque reduction step is executed when the second air/fuel ratio mode is selected in the air/fuel ratio mode setting step.

4. The control method according to claim 1, wherein the retardation suppression control is configured to prohibit the retardation of the ignition timing of the spark plug.

5. The control method according to claim 1, wherein the retardation suppression control is configured to limit a degree of the retardation of the ignition timing of the spark plug.

6. An engine system comprising:
 an engine mounted to a vehicle having steerable road wheels and mechanically coupled to drive road wheels of the vehicle, the engine including a spark plug;
 an operating state sensor configured to detect an operating state of the engine;
 a steering angle sensor configured to detect a steering angle of the steerable road wheels; and
 a controller,
 wherein the controller is configured to:
 select a combustion mode of the engine between a first combustion mode in which an entirety of an air-fuel mixture in a cylinder of the engine is combusted by a propagation of a flame produced by the spark plug, and a second combustion mode in which at least a part of an air-fuel mixture in the cylinder is combusted by a self-ignition, on the basis of a detection result by the operating state sensor;
 set a torque reduction amount by which an output torque of the engine is to be reduced, on the basis of a detection result by the steering angle sensor;
 execute a retardation control for controlling the spark plug so as to retard an ignition timing based on the set torque reduction amount, when the first combustion mode is selected; and
 execute a control for suppressing a degree of the retardation control based on the set torque reduction amount, when the second combustion mode is selected.

7. The control method according to claim 2, further comprising an air/fuel ratio mode setting step of, when the second combustion mode is selected in the combustion mode setting step, selecting an air/fuel ratio mode between a first air/fuel ratio mode in which the air-fuel mixture is set to be leaner than a stoichiometric air/fuel ratio, and a second air/fuel ratio mode in which the air-fuel mixture is set to be equal to or richer than the stoichiometric air/fuel ratio, on the basis of the operating state of the engine,
 wherein the retardation control in the torque reduction step is executed when the second air/fuel ratio mode is selected in the air/fuel ratio mode setting step.

8. The control method according to claim 2, wherein the retardation suppression control is configured to prohibit the retardation of the ignition timing of the spark plug.

9. The control method according to claim 3, wherein the retardation suppression control is configured to prohibit the retardation of the ignition timing of the spark plug.

10. The control method according to claim 7, wherein the retardation suppression control is configured to prohibit the retardation of the ignition timing of the spark plug.

11. The control method according to claim 2, wherein the retardation suppression control is configured to limit a degree of the retardation of the ignition timing of the spark plug.

12. The control method according to claim 3, wherein the retardation suppression control is configured to limit a degree of the retardation of the ignition timing of the spark plug.

13. The control method according to claim 7, wherein the retardation suppression control is configured to limit a degree of the retardation of the ignition timing of the spark plug.

* * * * *